(12) United States Patent
Roussille et al.

(10) Patent No.: US 9,045,992 B2
(45) Date of Patent: Jun. 2, 2015

(54) TURBOMACHINE BLADES OR VANES HAVING COMPLEMENTARY EVEN/ODD GEOMETRY

(75) Inventors: Clément Roussille, Bordeaux (FR); Julien Mateo, Carignan de Bordeaux (FR); Antoine Jean-Philippe Beaujard, Moissy-Cramayel (FR); Elric Georges André Fremont, Merignac (FR)

(73) Assignees: Herakles, Le Haillan (FR); Snecma, Paris (FR)

( * ) Notice: Subject to any disclaimer, the term of this patent is extended or adjusted under 35 U.S.C. 154(b) by 271 days.

(21) Appl. No.: 13/606,935

(22) Filed: Sep. 7, 2012

(65) Prior Publication Data

US 2013/0243604 A1   Sep. 19, 2013

Related U.S. Application Data

(63) Continuation-in-part of application No. PCT/FR2011/051473, filed on Jun. 24, 2011.

(30) Foreign Application Priority Data

Jun. 28, 2010 (FR) ...................................... 10 55160
Sep. 7, 2011 (FR) ...................................... 11 57925

(51) Int. Cl.
*F01D 5/28* (2006.01)
*B29C 70/24* (2006.01)
(Continued)

(52) U.S. Cl.
CPC ........... *F01D 5/282* (2013.01); *Y10T 29/49321* (2015.01); *Y10T 29/49323* (2015.01);
(Continued)

(58) Field of Classification Search
CPC ............. F01D 5/00; F01D 5/282; F01D 9/02; F01D 25/00

USPC ............... 29/889.71; 416/229 R, 230, 241 A, 416/241 B, 241 R; 415/191, 200, 230
See application file for complete search history.

(56) References Cited

U.S. PATENT DOCUMENTS 6,196,794 B1   3/2001   Matsumoto
6,227,798 B1   5/2001   Demers et al.
(Continued)

FOREIGN PATENT DOCUMENTS

EP   1 607 581 A1   12/2005
FR   2 664 518 A1   1/1992
(Continued)

OTHER PUBLICATIONS

U.S. Appl. No. 13/515,879, filed Jun. 14, 2012, Nunez, et al.
(Continued)

*Primary Examiner* — Nathaniel Wiehe
*Assistant Examiner* — Woody A Lee, Jr.
(74) *Attorney, Agent, or Firm* — Oblon, McClelland, Maier & Neustadt, L.L.P.

(57) ABSTRACT

A turbomachine blade made of composite material including a fiber reinforcement obtained by three-dimensional weaving of yarns and densified by a matrix, includes a first portion constituting an airfoil and a blade root. The first portion constitutes a single part with at least one second portion constituting a blade inner platform, the blade then lacking a blade anti-tilting wall, or a blade anti-tilting wall, the blade then lacking a blade inner platform. The first portion also constitutes a single part with at least one third portion constituting a blade outer platform spoiler plate, the blade then lacking a blade outer platform wiper plate, or a blade outer platform wiper plate, the blade then lacking a blade outer platform spoiler plate.

30 Claims, 18 Drawing Sheets

(51) Int. Cl.
  *D03D 25/00* (2006.01)
  *F01D 5/14* (2006.01)
  *F01D 5/22* (2006.01)
  *C04B 35/571* (2006.01)
  *C04B 35/628* (2006.01)
  *C04B 37/00* (2006.01)
  *B29L 31/08* (2006.01)

(52) U.S. Cl.
  CPC .......... *Y10T29/49337* (2015.01); *B29C 70/24* (2013.01); *D03D 25/005* (2013.01); *F01D 5/147* (2013.01); *F01D 5/225* (2013.01); *F05D 2300/603* (2013.01); *Y02T 50/672* (2013.01); *Y02T 50/673* (2013.01); *B29L 2031/08* (2013.01); *C04B 35/571* (2013.01); *C04B 35/62868* (2013.01); *C04B 35/62873* (2013.01); *C04B 37/005* (2013.01); *C04B 37/006* (2013.01); *C04B 2235/5244* (2013.01); *C04B 2235/5252* (2013.01); *C04B 2235/614* (2013.01); *C04B 2237/365* (2013.01); *C04B 2237/38* (2013.01); *C04B 2237/60* (2013.01)

(56) References Cited

U.S. PATENT DOCUMENTS

| | | | |
|---|---|---|---|
| 6,676,373 B2 * | 1/2004 | Marlin et al. | 415/191 |
| 6,821,087 B2 * | 11/2004 | Matsumoto et al. | 415/191 |
| 7,241,112 B2 * | 7/2007 | Dambrine et al. | 415/230 |
| 2007/0154318 A1 | 7/2007 | Saltman et al. | |
| 2009/0136350 A1 | 5/2009 | Whitton | |
| 2011/0311368 A1 | 12/2011 | Coupe et al. | |
| 2012/0055609 A1 | 3/2012 | Blanchard et al. | |

FOREIGN PATENT DOCUMENTS

| | | |
|---|---|---|
| FR | 2 745 808 A1 | 9/1997 |
| FR | 2 940 350 A1 | 6/2010 |
| WO | 2010/061140 | 6/2010 |
| WO | 2010/116066 | 10/2010 |
| WO | 2011/080443 A1 | 7/2011 |

OTHER PUBLICATIONS

U.S. Appl. No. 13/607,131, filed Sep. 7, 2012, Roussille, et al.
U.S. Appl. No. 13/607,371, filed Sep. 7, 2012, Nunez, et al.
U.S. Appl. No. 13/607,341, filed Sep. 7, 2012, Coupe, et al.
International Search Report mailed on Oct. 31, 2011, issued for International Application No. PCT/FR2011/051473, filed on Jun. 24, 2011 (English).
French Search Report mailed on May 2, 2012, issued for French Application No. 1157925, filed on Sep. 7, 2011 (with English translation of categories).

* cited by examiner

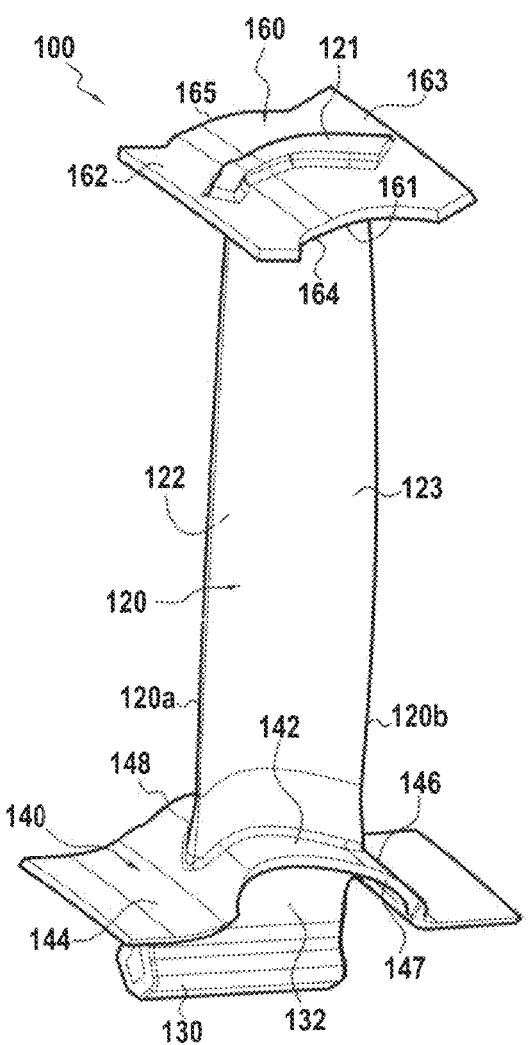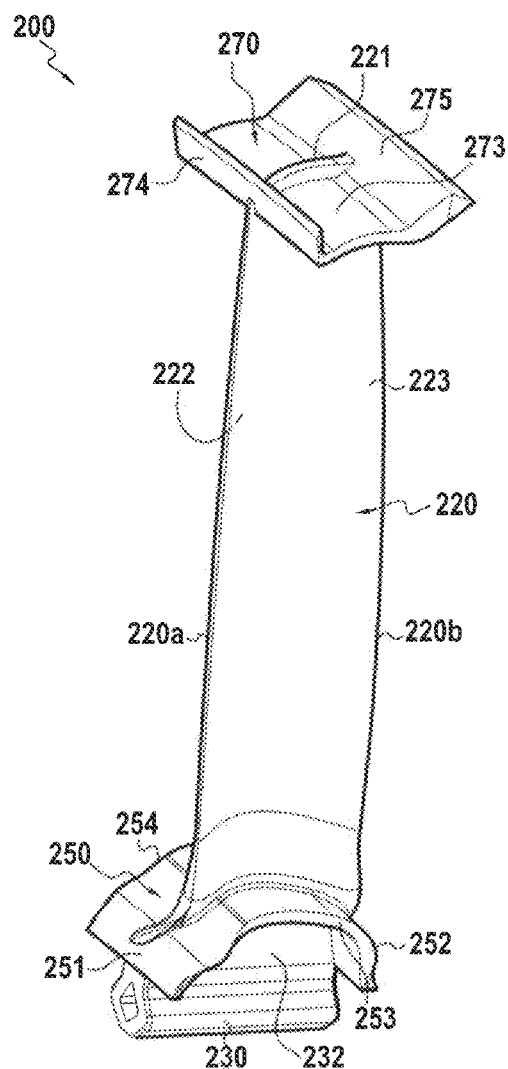

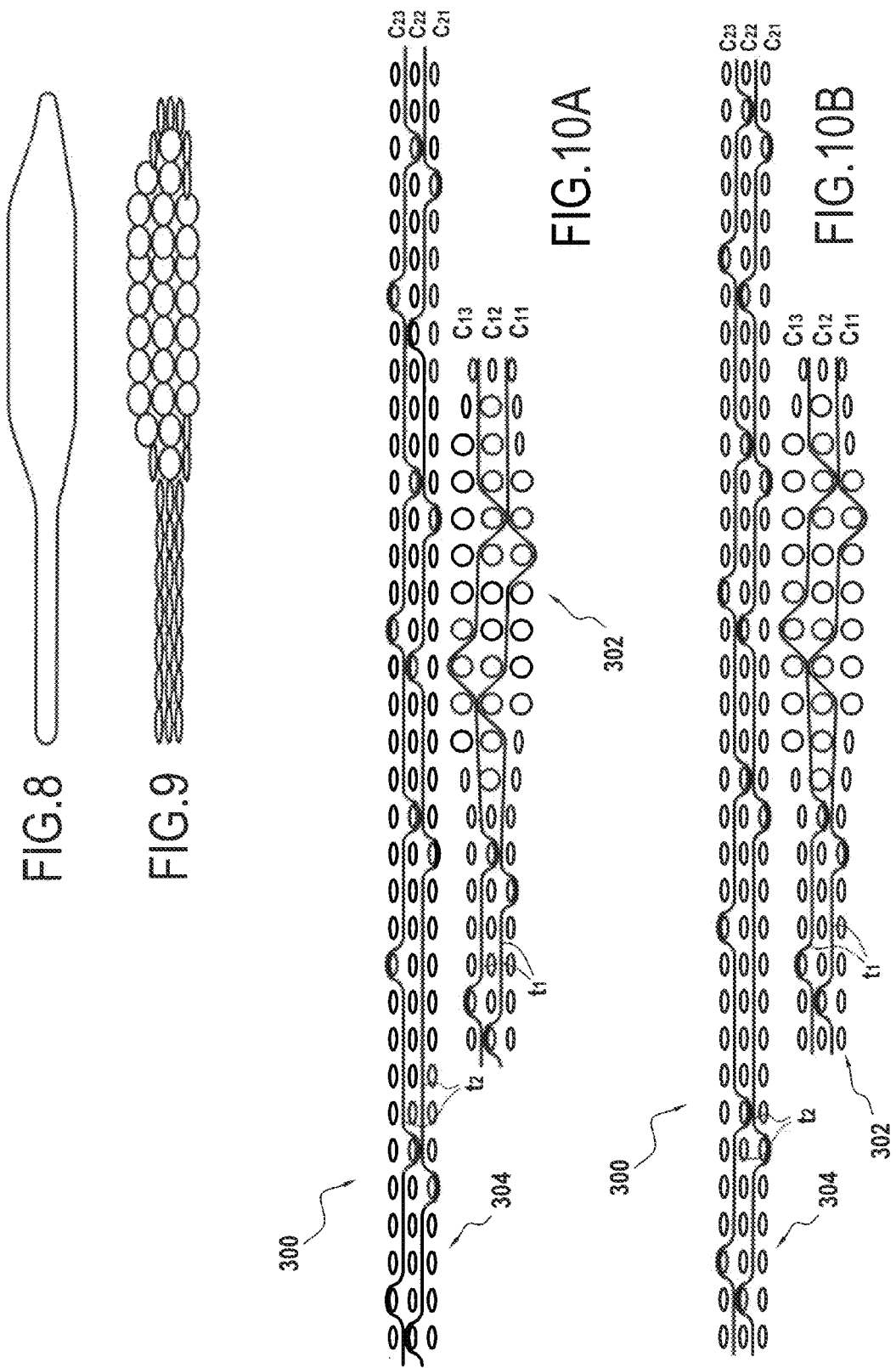

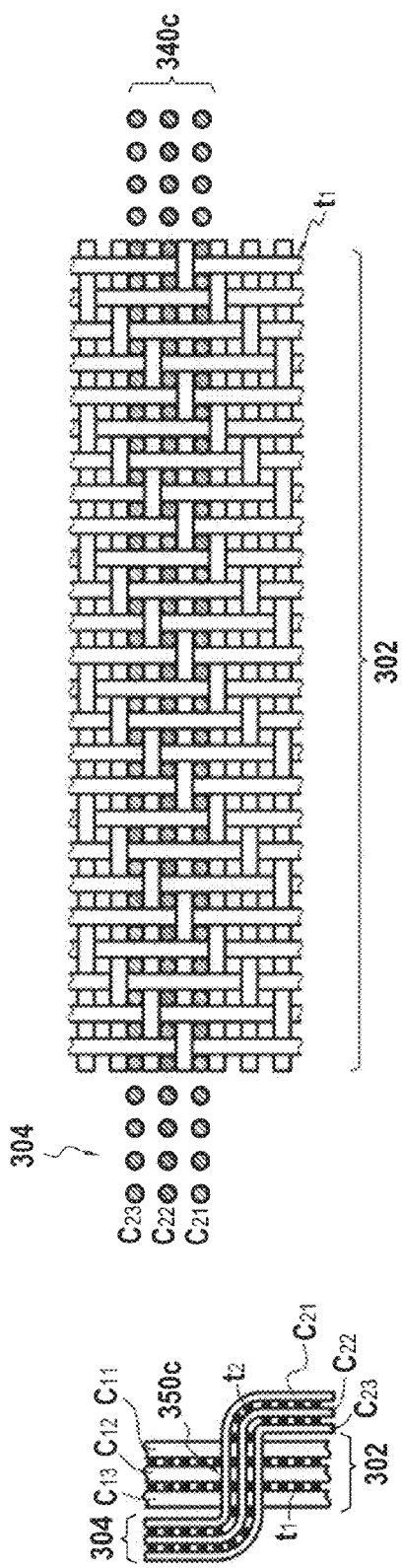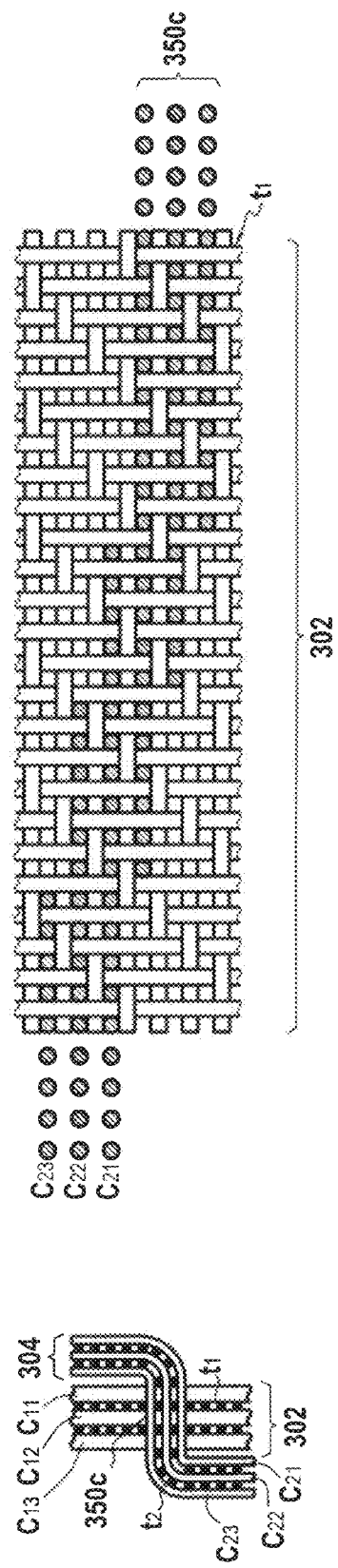

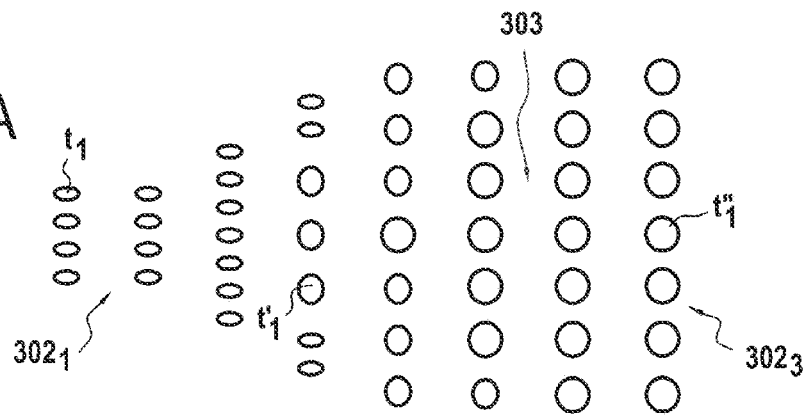
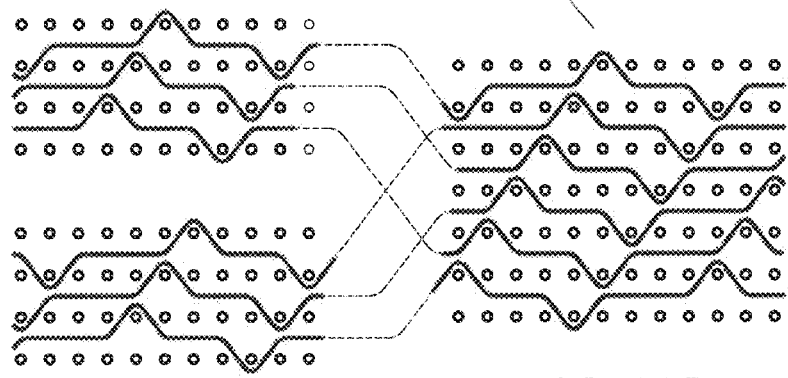
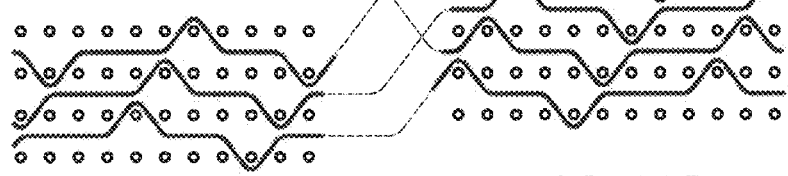
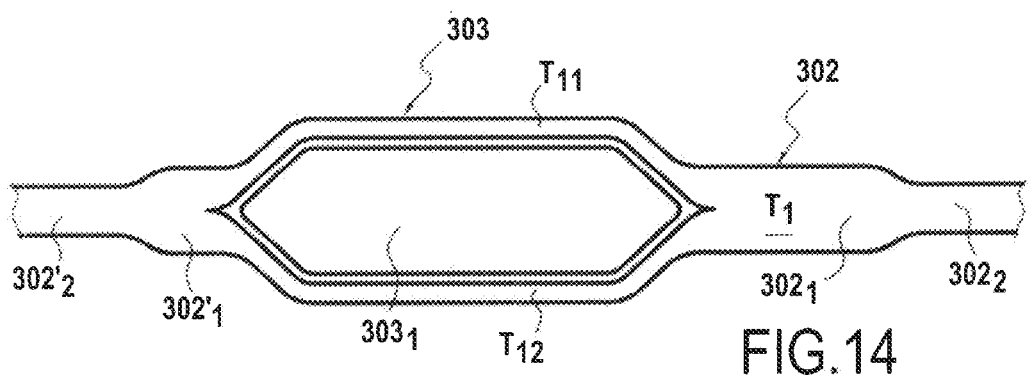

TURBOMACHINE BLADES OR VANES HAVING COMPLEMENTARY EVEN/ODD GEOMETRY

RELATED APPLICATIONS

The present application is a Continuation-in-Part Application based on PCT Application PCT/FR2011/051473 claiming priority of French Patent Application No 1055160 filed on Jun. 28, 2010 and incorporates subject matter derived from French Patent Application No 1157925 filed on Sep. 7, 2011, of which priority is also claimed.

BACKGROUND OF THE INVENTION

The invention relates to turbomachine blades or vanes made of composite material including a fiber reinforcement densified by a matrix. The invention relates also to turbomachine turbine or compressor wheels or wheel segments incorporating such composite material blades or vanes.

The intended field is that of aeroengines or industrial turbines.

The fabrication of turbomachine blades of composite material has already been proposed. Reference can be made in particular to international patent application PCT/FR2009/052309 filed jointly by SNECMA and SNECMA Propulsion Solide. This application describes the fabrication of a turbomachine blade made of composite material including a fiber reinforcement densified by a matrix. More precisely, this method exhibits the feature that the fiber blank fabricated by three-dimensional weaving is shaped to obtain a one-piece fiber preform having a first portion constituting an airfoil and blade root preform and at least one second portion constituting an inner platform or blade outer platform preform. Thus, after densification of the preform, it is possible to obtain a blade made of composite material having a fiber reinforcement consisting of the preform and densified by the matrix, and forming a single piece with integrated inner platform and/or outer platform.

The blade obtained by such a method has the disadvantage that its outer platform cannot integrate both a function of sealing (through the presence of wipers) to the housing which surrounds the blades and an aerodynamic function (by the presence of covering spoilers defining the outside of the flowpath of the gas stream in the turbine).

French patent application No. 09 58931 filed jointly by SNECMA and SNECMA Propulsion Solide, describes the fabrication of a blade made of composite material forming a single piece with integrated inner platform and outer platform, the outer platform providing both the sealing function and the aerodynamic function.

However, the fabrication of such an outer platform with the method described in French patent application No. 09 58931 involves in particular shaping and molding operations with two-layer fiber structures, operations which are completely feasible but which can be more complex to carry out than with single-layer structures. In addition, the blade thus fabricated does not incorporate an anti-tilting wall.

Further, in the event of damage to the outer platform of the blade fabricated according to the method described in French patent application No. 09 58931, the aerodynamic function and the sealing function are both impacted because the outer platform is formed in a single piece providing both functions.

Use of CMC materials has also been proposed for turbine nozzles, in particular in application WO 2010/146288.

A conventional metallic turbine nozzle or compressor stator is formed of several assembled sectors, each sector comprising an inner platform, an outer platform and a plurality of airfoils extending between the inner and outer platforms and integral therewith. The inner and outer platforms delimit the gas or air flow passage in the turbine nozzle or compressor stator. On the outside, the outer platforms of the segments are formed integrally with legs allowing the mounting of the turbine nozzle or compressor stator in a casing.

OBJECTS AND SUMMARY OF THE INVENTION

According to one object of the invention, it is desirable to be able to have available turbomachine blades made of composite material, particularly but not necessarily made of thermostructural composite material such as CMC, for turbomachine compressors or turbines, blades that are relatively simple to fabricated and which incorporate the required functions, particularly the functions of sealing, of defining the passage for the flow stream (aerodynamic function), and of anti-tilting.

To this end, according to the present invention, a method is proposed for fabricating a turbomachine blade made of composite material including a fiber reinforcement densified by a matrix, the method including:
  the fabrication by three-dimensional weaving of a one-piece fiber blank,
  the shaping of the fiber blank to obtain a one-piece fiber blade perform having:
  a first portion constituting a blade airfoil and root preform,
  a second portion constituting a preform of a blade inner platform, said blade preform then lacking a preform of a blade anti-tilting wall, or constituting a blade anti-tilting wall, said blade preform then lacking a blade inner platform perform, and
  a third portion constituting the preform of a blade outer platform spoiler plate, said blade preform then lacking a blade outer platform wiper plate preform, or
  a second portion constituting the preform of a blade anti-tilting wall, said blade preform then lacking a blade inner platform preform, and
  a third portion constituting the preform of a blade outer platform spoiler plate, said blade preform then lacking a blade outer platform wiper plate preform, or constituting the preform of a blade outer platform wiper plate, said blade preform then lacking a blade outer platform spoiler plate preform,
  the densification of the preform by a matrix to obtain a blade made of composite material having a fiber reinforcement consisting of the preform and densified by the matrix, and forming a single part with two of the following elements: blade inner platform, blade anti-tilting wall, blade outer platform spoilers or with two of the following elements: blade anti-tilting wall, blade outer platform spoilers and blade outer platform wipers.

Compared to the method described in patent application No. 09 58931, the invention contemplates a first blade providing two of the following functions: radially inward flow passage definition, radially outward flow passage definition, sealing and anti-tilting, and a second blade providing the two other functions not provided for by the first blade, each of these functions being accomplished by distinct portions of the blades which are manufactured with single-layer textures. The first and second blades thus fabricated exhibit complementary geometries which make it possible, by interleaving these first and second blades in succession, to provide all the functions required on both surfaces of the airfoils facing each of said blades.

According to one advantageous feature of the method, in the longitudinal direction of the fiber blank corresponding to the longitudinal direction of the blade to be fabricated, the fiber blank includes a first set of several layers of yarns which are interlinked to constitute a first portion of the blank corresponding to the preform of the blade and blade root, and a second set of several layers of yarns which are interlinked at least locally to constitute a second portion of the blank corresponding to a preform of a platform or of an anti-tilting wall and a third portion of the blank corresponding to a blade outer platform spoiler or wipers plate preform, the yarns of the second set of yarn layers not being linked to the yarns of the second set of yarn layers, and the first set of yarn layers having yarns from the second set of yarn layers passing through it at the or each second portion of the blank.

The provision of areas of separation allows shaping of the fiber preform without cutting connecting yarns, as such cutting can reduce the mechanical strength of the fiber reinforcement, hence of the fabricated blade.

According to another feature of the method, the fiber blank is woven with a second continuous set of yarn layers and the shaping of the fiber blank includes the elimination, by cutting them out, of portions of the second set of yarn layers outside of the second portion of the fiber blank and of the third portion of the fiber blank.

According to still another feature of the method, at the location or at least at one of the locations where the first set of yarn layers has yarns from the second set of yarn layers passing through it, the intersection of a yarn layer of the first set and a yarn layer of the second set follows a line that is not orthogonal to the longitudinal direction of the fiber blank.

It is also possible to fabricate a blade made of composite material with an inner platform and/or an outer platform that extends generally non-perpendicularly to the longitudinal direction of the blade.

According to yet another feature of the method, in the first portion of the fiber blank and in a direction corresponding to that extending along the profile of a variable thickness airfoil in the blade to be fabricated, the number of yarn layers in the longitudinal direction in the first set of yarn layers is constant. The yarns of the first set of yarns can then be of variable weight and/or count.

Advantageously, a strip comprising a succession of fiber blanks is fabricated by three-dimensional weaving. These can then be cut out of the strip. The blanks can be woven with the longitudinal direction of the blade to be fabricated in the weft direction or in the warp direction.

According to the present invention, a turbomachine blade made of composite material is also proposed having a fiber reinforcement obtained by three-dimensional weaving of yarns and densified by a matrix, the blade including a first portion constituting an airfoil and a blade root, wherein:
said first portion constitutes a single part with at least:
a second portion constituting a blade platform, said blade then lacking a blade anti-tilting wall, or a blade anti-tilting wall, said blade then lacking a blade inner platform, and
a third portion constituting a blade outer platform spoiler plate, said blade then lacking a blade outer platform wiper plate, or
a second portion constituting a blade anti-tilting wall, said blade then lacking a blade inner platform, and
a third portion constituting a blade outer platform spoiler plate, said blade then lacking a blade outer platform wiper plate, or a blade outer platform wiper plate, said blade then lacking a blade outer platform spoiler plate.

The blade can be made of a ceramic matrix composite material.

According to one feature of the blade, yarns constituting the portion of the fiber reinforcement corresponding to the second portion of the blade run through the portion of the fiber reinforcement corresponding to the first portion of the blade.

The airfoil of the blade can have a variable thickness profile along which the part of the fiber reinforcement corresponding to the first portion of the blade has, in the longitudinal direction of the blade, a constant number of layers of yarns having a variable weight and/or count, or a variable number of yarn layers.

The invention also proposes a blade set comprising a first and a second blade according to the blade of the invention, the second portion of the first blade constituting a blade inner platform, the first blade then lacking a blade anti-tilting wall, the third portion of the first blade constituting a blade outer platform spoiler plate, the first blade then lacking a blade outer platform wiper plate, the second portion of the second blade constituting a blade anti-tilting wall, the second blade then lacking a blade inner platform, the third portion of the second blade constituting a blade outer platform wiper plate, the second blade then lacking a blade outer platform spoiler plate.

According to one variant of implementation, the invention also proposes a blade set comprising a first and a second blade according to the blade of the invention, the second portion of the first blade constituting a blade anti-tilting wall, the first blade then lacking a blade inner platform, the third portion of the first blade constituting a blade outer platform spoiler plate, the first blade then lacking a blade outer platform wiper plate, the second portion of the second blade constituting a blade inner platform, the second blade then lacking a blade anti-tilting wall, the third portion of the second blade constituting a blade outer platform wiper plate, the second blade then lacking a blade outer platform spoiler plate.

The invention also relates to a turbomachine rotor or disk and a turbomachine equipped with a plurality of blade sets such as those defined in the foregoing.

The invention also proposes a method for making at least a segment of a turbomachine wheel, the method comprising assembling together a plurality of first blades or vanes and a plurality of second blades or vanes in alternation with the first blades or vanes, the first and second blades or vanes being made of composite material including a fiber reinforcement made by three-dimensional weaving and densified by a matrix, each of the first blades or vanes comprising a first portion forming at least an airfoil and formed integrally with:
a second portion selected from a flowpath delimiting inner platform portion and an inner portion of an inner platform, and
a third portion selected from a flowpath delimiting outer platform portion and an outer portion of an outer platform,
each of the second blades or vanes comprising a first portion forming at least an airfoil and formed integrally with:
a second portion selected from a flowpath delimiting inner platform portion and an inner portion of an inner platform, the second portion of a second blade or vane being different from the second portion of a first blade or vane, and
a third portion selected from a flowpath delimiting outer platform portion and an outer portion of an outer platform, the third portion of a second blade or vane being different from the third portion of a first blade or vane.

The making of each blade or vane may comprise:
the fabrication by three-dimensional weaving of a one-piece fiber blank,
the shaping of the fiber blank to obtain a one-piece fiber blade or vane preform having:
a first portion constituting a preform of the first blade or vane portion,
a second portion constituting a preform of the second blade or vane portion, and
a third portion constituting a preform of the third blade or vane portion, and
the densification of the preform by a matrix to obtain a blade or vane made of composite material having a fiber reinforcement consisting of the preform and densified by the matrix, and incorporating in a single part said first, second and third blade or vane portions.

According to a particular feature of the method, in the longitudinal direction of the fiber blank corresponding to the longitudinal direction of the blade or vane to be fabricated, the fiber blank includes a first set of several layers of yarns which are linked together at least partially to constitute a first portion of the blank corresponding to the first preform portion, and a second set of several layers of yarns which are linked together at least locally to constitute a second and a third portion of the blank corresponding to the second and the third preform portion,
the yarns of the first set of yarn layers being not linked to the yarns of the second set of yarn layers, and
the first set of yarn layers has yarns of the second set of yarn layers passing through it at the second and at the third portion of the blank.

In a particular implementation, a turbomachine rotating wheel is made by assembling the first and second blades together with a rotor disk, the first portion of each first and second blade forming an airfoil and a blade root, and the blade roots being inserted into recesses provided at the periphery of the rotor disk,
the second portion of a first or second blade being selected from a flowpath delimiting inner platform portion and an inner anti-tilting wall of an inner platform, and
the third portion of a first or second blade being selected from a flowpath delimiting outer platform portion and an outer wiper plate of an outer platform.

The invention also proposes a method for fabricating a turbomachine turbine nozzle segment or compressor stator segment out of a composite material, the method comprising assembling and connecting together a plurality of first vanes and a plurality of second vanes in alternation with the first blades or vanes, the first and second vanes being made of composite material including a fiber reinforcement made by three-dimensional weaving and densified by a matrix, wherein:
each of the first vanes comprises a first portion forming an airfoil and formed integrally with a second portion forming an inner platform and with a third portion forming a flowpath delimiting outer platform portion;
each of the second vanes comprises a first portion forming an airfoil and formed integrally with a second portion forming an inner platform and with a third portion forming an outer platform portion constituting hooking legs;
the third portion of the first vanes lacking an outer platform portion constituting hooking legs and the third portion of the second vanes lacking a flowpath delimiting outer platform portion;
the making of each vane comprising: making a one-piece fiber blank by three-dimensional weaving, shaping of the fiber blank to obtain a one-piece vane preform having a first preform portion forming a preform for the first vane portion and a second preform portion forming a preform for the second and third vane portion, and densifying the preform with a matrix to obtain a composite material vane having fiber reinforcement constituted by the preform and densified by the matrix; and
the vanes being connected together by a process including a step selected from a brazing step and a step of connection by co-densification by a matrix of a plurality of vanes assembled together at an intermediary stage of densification.

The making of each vane may comprise a step of partial densification of the vane preform by a matrix and a subsequent machining step, and the connection of a plurality of vanes together may comprise assembling machined vanes together and co-densification by a matrix of the assembled machined vanes.

For fabricating a turbine nozzle segment or compressor stator segment out of a ceramic matrix composite material, the assembling of the machined vanes together may comprise a pre-ceramic bonding step.

Still for fabricating a turbine nozzle segment or compressor stator segment out of a ceramic matrix composite material, the making of each vane may comprise a first and a second step of densification by a ceramic matrix separated by a machining step, and the connection of a plurality of vanes together may comprise a step of brazing together vanes assembled together after the second densification step.

According to a particular feature of the method, in the longitudinal direction of the fiber blank that corresponds to the longitudinal direction of a vane that is to be made, the fiber blank comprises a first set of a plurality of layers of yarns that are linked together at least partially together to form a first portion of the blank that corresponds to the first portion of the preform, and a second set of a plurality of layers of yarns that are linked together at least locally to form a second portion of the blank that corresponds to the second portion of the preform and to form a third portion of the blank that corresponds to the third portion of the preform,
the yarns of the first set of layers of yarns being not linked to the yarns of the second set of layers of yarns,
and yarns of the second set of layers of yarns passing through the first set of layers of yarns at first and second crossing locations corresponding to the locations of the second and third portions of the blank, respectively.

The invention also provides a method for fabricating a turbomachine turbine nozzle segment or compressor stator segment out of a composite material, the method comprising assembling and connecting together a plurality of first vanes and a plurality of second vanes in alternation with the first blades or vanes, the first and second vanes being made of composite material including a fiber reinforcement made by three-dimensional weaving and densified by a matrix, wherein:
each of the first vanes comprises a first portion forming an airfoil and formed integrally with a second portion forming a flowpath delimiting inner platform portion and with a third portion forming an outer platform;
each of the second vanes comprises a first portion forming an airfoil and formed integrally with a second portion forming an inner platform portion constituting hooks or overhangs and with a third portion forming an outer platform;
the second portion of the first vanes lacking an inner platform portion constituting hooks or overhangs and the second portion of the second vanes lacking a flowpath delimiting inner platform portion;

the making of each vane comprises: making a one-piece fiber blank by three-dimensional weaving, shaping of the fiber blank to obtain a one-piece vane preform having a first preform portion forming a preform for the first vane portion and a second preform portion forming a preform for the second and third vane portion, and densifying the preform with a matrix to obtain a composite material vane having fiber reinforcement constituted by the preform and densified by the matrix; and the vanes are connected together by a process including a step selected from a brazing step and a step of connection by co-densification by a matrix of a plurality of vanes assembled together at an intermediary stage of densification.

The making of each vane may comprise a step of partial densification of the vane preform by a matrix and a subsequent machining step, and the connection of a plurality of vanes together comprises assembling machined vanes together and co-densification by a matrix of the assembled machined vanes.

For fabricating a turbine nozzle segment or compressor stator segment out of a ceramic matrix composite material, the assembling of the machined vanes together may comprise a pre-ceramic bonding step.

Still for fabricating a turbine nozzle segment or compressor stator segment out of a ceramic matrix composite material, the making of each vane may comprise a first and a second step of densification by a ceramic matrix separated by a machining step, and the connection of a plurality of vanes together comprises a step of brazing together vanes assembled together after the second densification step.

According to a particular feature of the method, in the longitudinal direction of the fiber blank that corresponds to the longitudinal direction of a vane that is to be made, the fiber blank comprises a first set of a plurality of layers of yarns that are linked together at least partially together to form a first portion of the blank that corresponds to the first portion of the preform, and a second set of a plurality of layers of yarns that are linked together at least locally to form a second portion of the blank that corresponds to the second portion of the preform and to form a third portion of the blank that corresponds to the third portion of the preform, the yarns of the first set of layers of yarns being not linked to the yarns of the second set of layers of yarns, and yarns of the second set of layers of yarns passing through the first set of layers of yarns at first and second crossing locations corresponding to the locations of the second and third portions of the blank, respectively.

The invention also provides a turbomachine turbine nozzle segment or compressor stator segment comprising a plurality of first and second vanes which are connected together with the first vanes alternating with the second vanes, the first and second vanes being made of composite material including a fiber reinforcement made by three-dimensional weaving and densified by a matrix, each of the first vanes comprising a first portion forming an airfoil and formed integrally with a second portion forming an inner platform and with a third portion forming a flowpath delimiting outer platform portion;

each of the second vanes comprising a first portion forming an airfoil and formed integrally with a second portion forming an inner platform and with a third portion forming an outer platform portion constituting hooking legs; and the third portion of the first vanes lacking an outer platform portion constituting hooking legs and the third portion of the second vanes lacking a flowpath delimiting outer platform portion.

A turbine nozzle or compressor stator may then be obtained comprising a casing and a plurality of segments mounted in the casing by means of said hooking legs.

The invention also provides a turbomachine turbine nozzle segment or compressor stator segment comprising a plurality of first and second vanes which are connected together with the first vanes alternating with the second vanes, the first and second vanes being made of composite material including a fiber reinforcement made by three-dimensional weaving and densified by a matrix, each of the first vanes comprising a first portion forming an airfoil and formed integrally with a second portion forming a flowpath delimiting inner platform portion and with a third portion forming an outer platform;

each of the second vanes comprises a first portion forming an airfoil and formed integrally with a second portion forming an inner platform portion constituting hooks or overhangs and with a third portion forming an outer platform; and the second portion of the first vanes lacking an inner platform portion constituting hooks or overhangs and the second portion of the second vanes lacking a flowpath delimiting inner platform portion.

A turbine nozzle or compressor stator may then be obtained comprising a plurality of segments supporting an abradable material carrying ring by means of said hooks.

BRIEF DESCRIPTION OF DRAWINGS

The invention will be better understood from the description given hereafter, by way of indication but without limitation, with reference to the appended drawings wherein:

FIG. 1 is a perspective view of a turbomachine blade with integrated inner platform and outer platform spoiler;

FIG. 2 is a perspective view of a turbomachine blade with integrated anti-tilting wall and outer platform wiper plate;

FIG. 8 is a section view showing the flattened profile of a blade airfoil such as that in FIG. 1 or 2;

FIG. 9 is a section view of a set of warp yarn layers making it possible to obtain a profile such as that in FIG. 8;

FIGS. 10A and 10B are warp section views showing one method of weaving of the fiber blank of FIG. 1;

FIG. 11A is a partial section view in a plane parallel to the warp and weft directions in a portion of the fiber blank FIG. 3 corresponding to the location of junction between the airfoil and the blade inner platform or anti-tilting wall;

FIG. 11B is a partial weft section view in a portion of the fiber blank of FIG. 3 corresponding to the location of the junction between the airfoil and the blade inner platform or anti-tilting wall;

FIG. 12A is a partial section view in a plane parallel to the warp and weft directions in a portion of the fiber blank of FIG.

Figure 3:
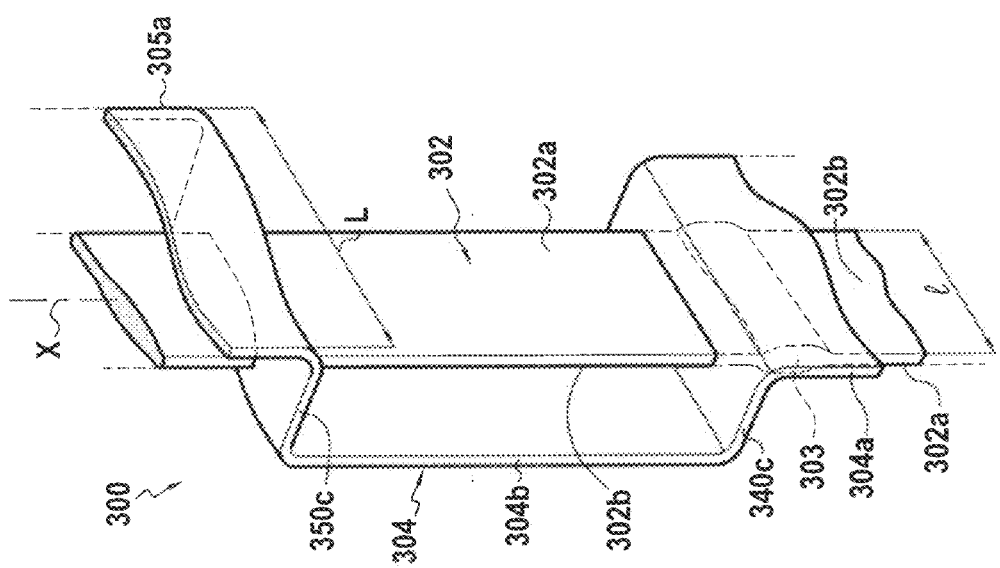
FIG. 3 illustrates very schematically the arrangement of two sets of yarn layers in a three-dimensionally woven fiber blank intended for the fabrication of a fiber preform for a blade such as that illustrated by FIG. 1.
Figure 16:
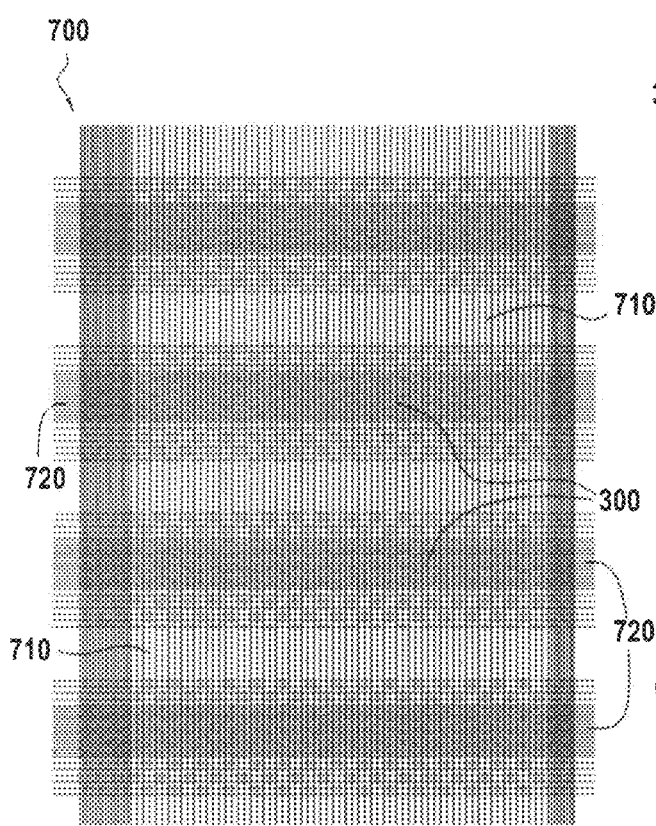
Figure 15:
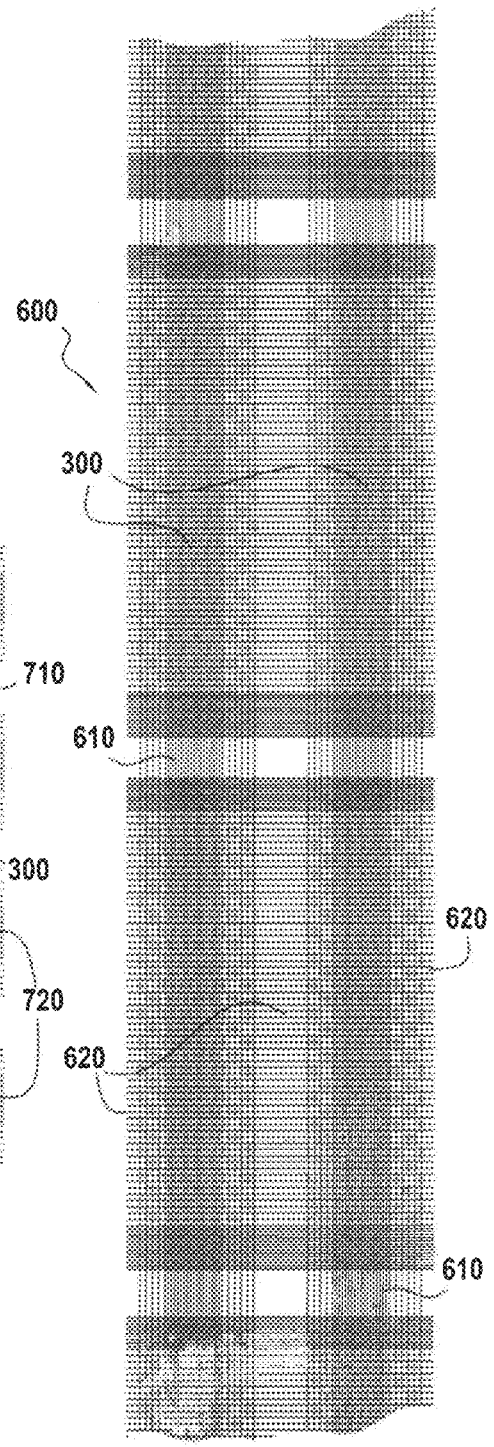
Figure 17:
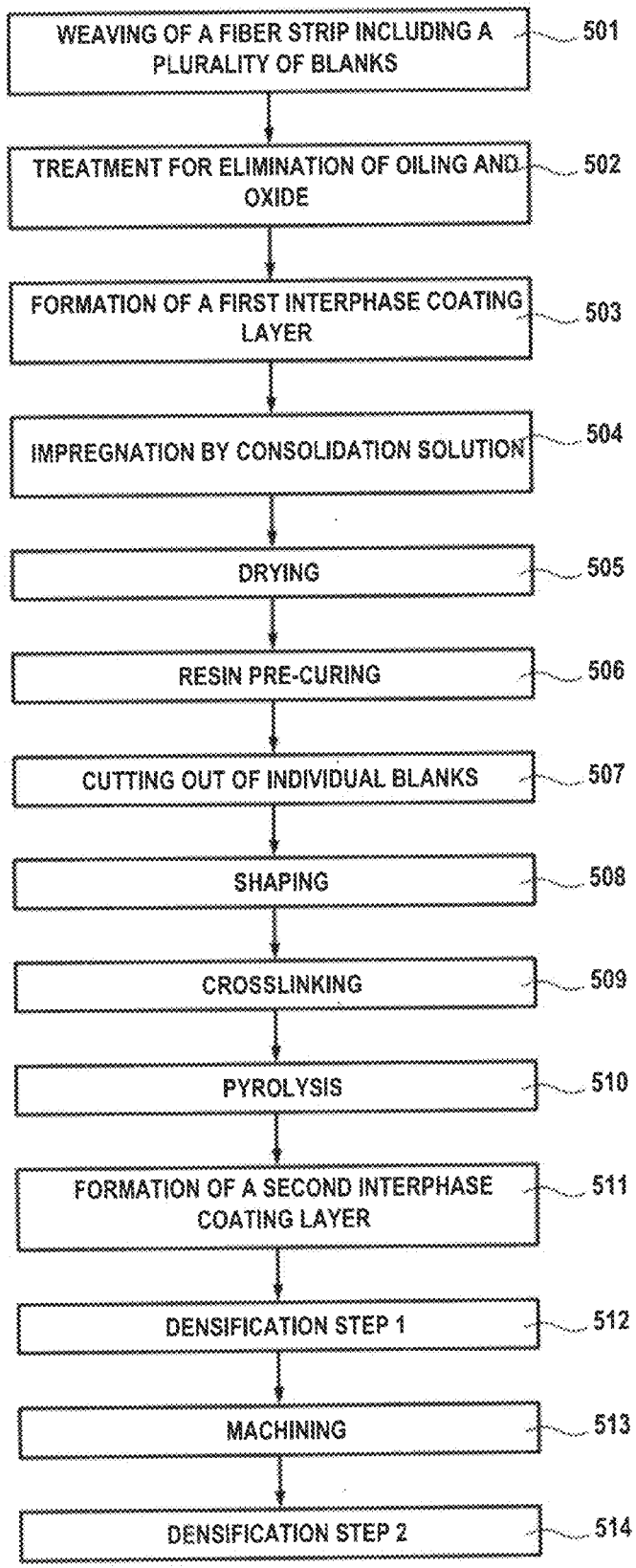
Figure 18:
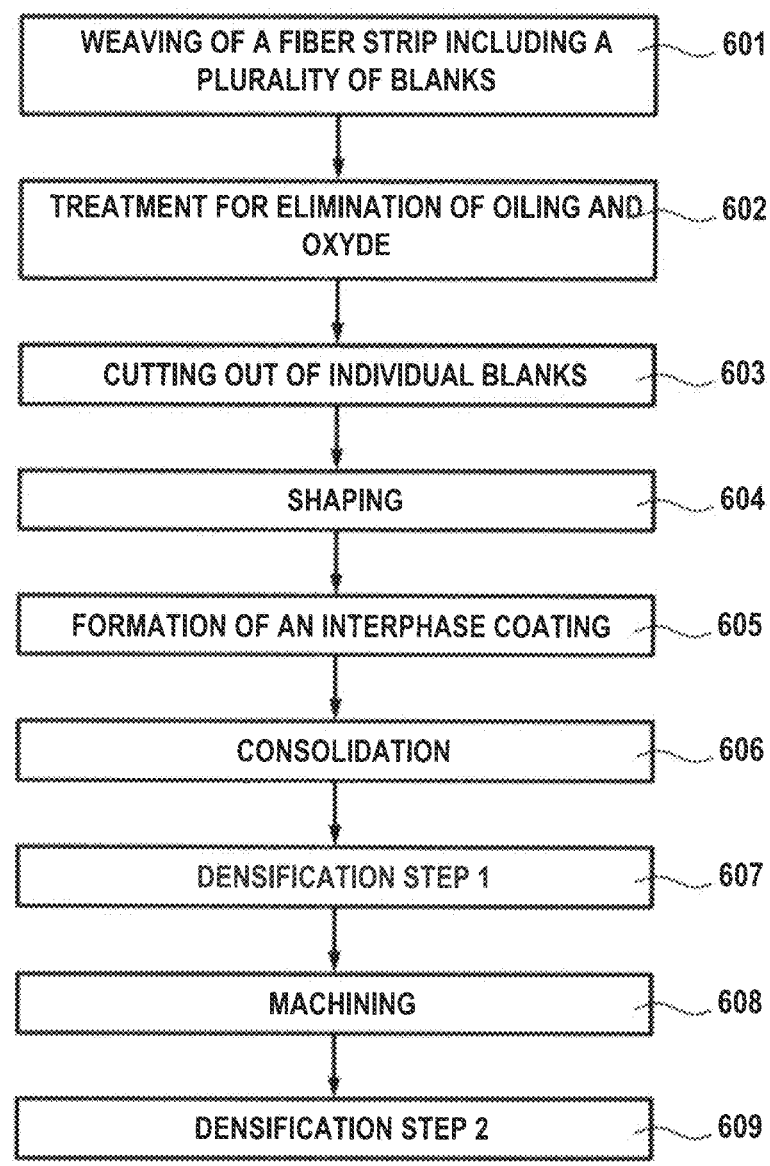
Figure 19:
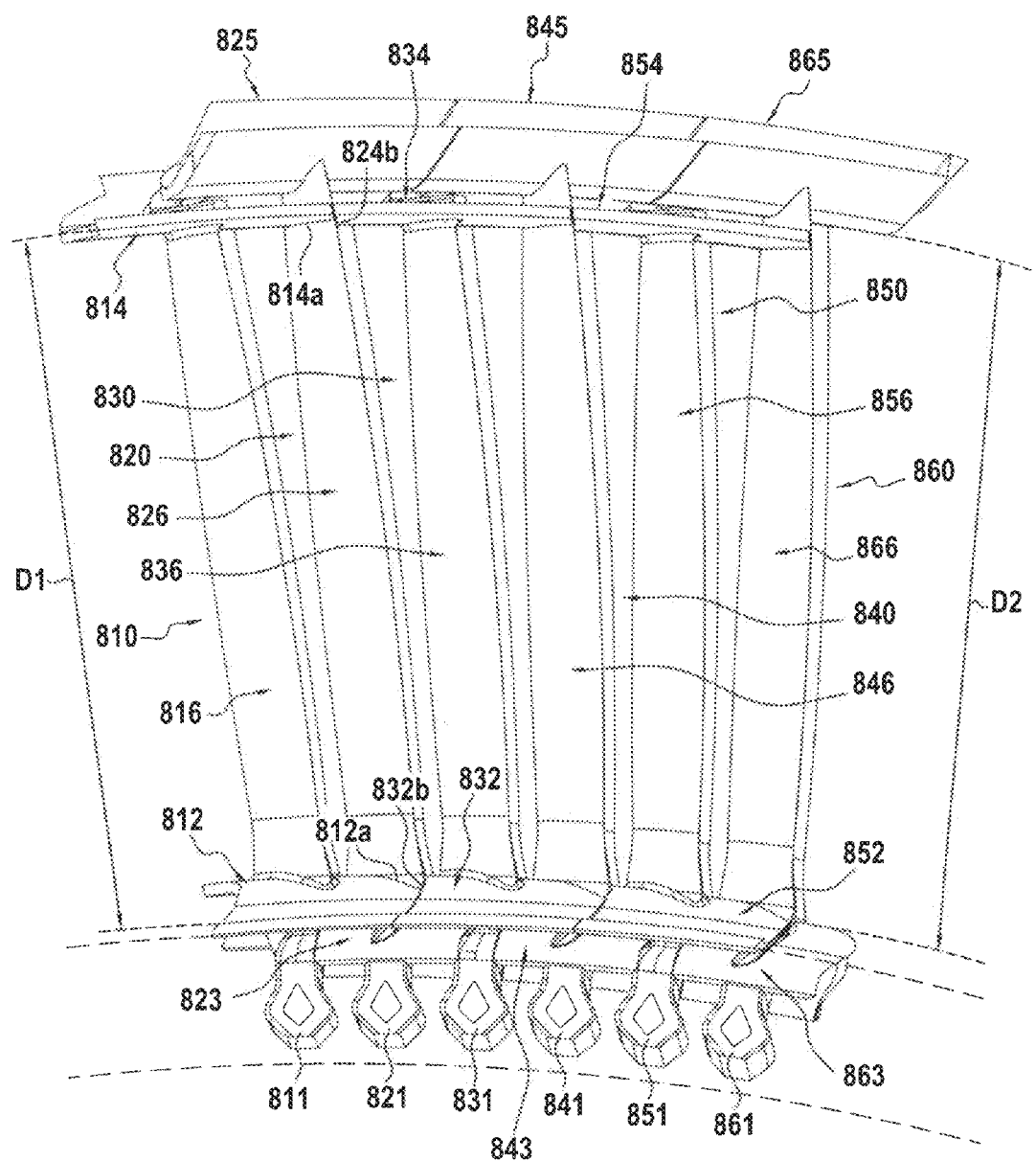
Figure 20:
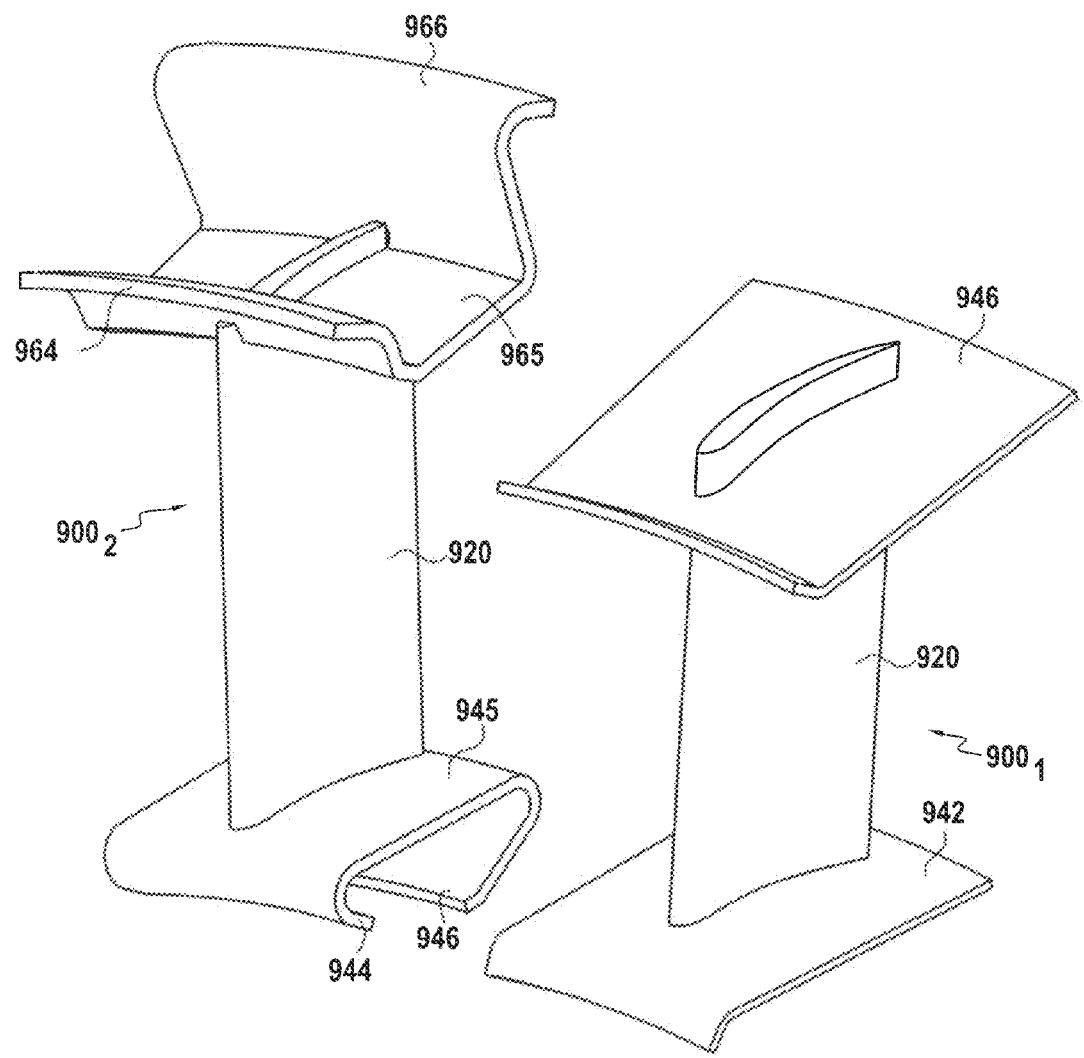
Figure 24:
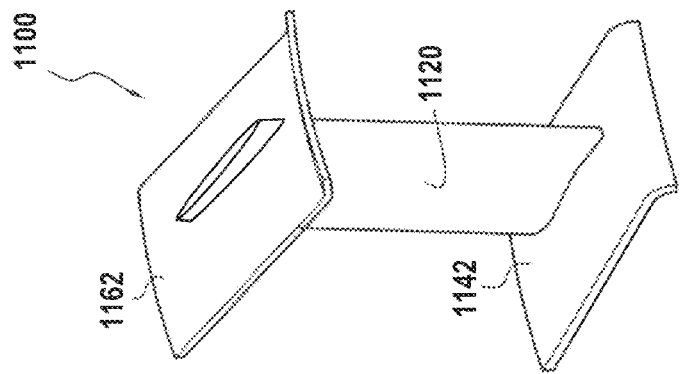
Figure 23:
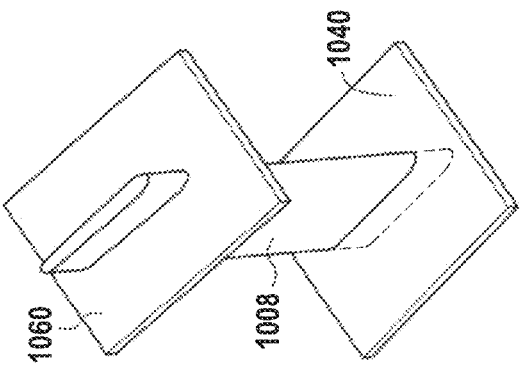
Figure 22:
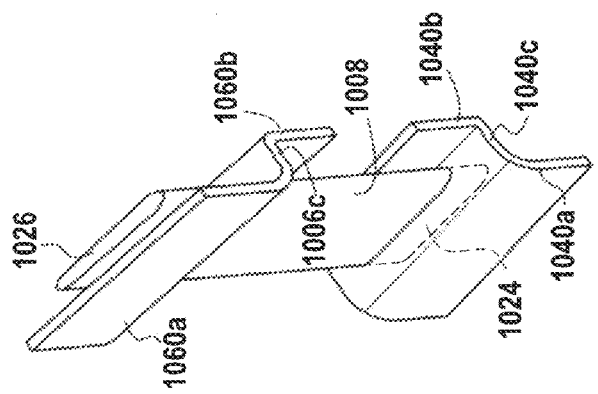
Figure 21:
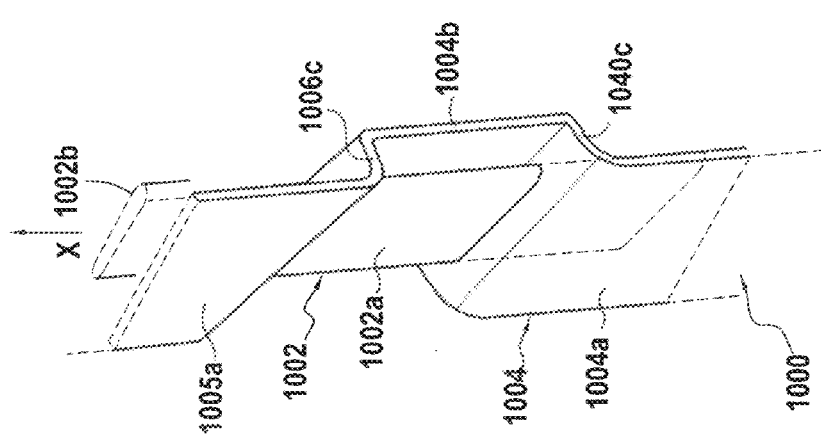
Figure 25:
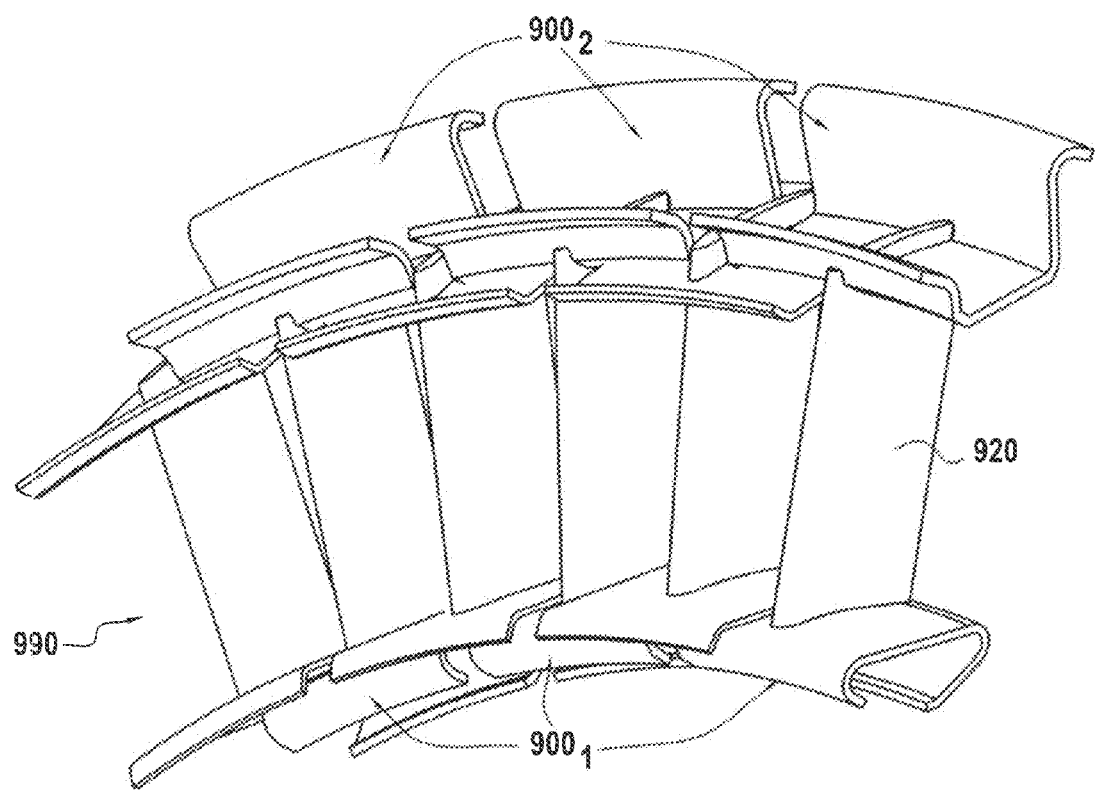
Figure 26:
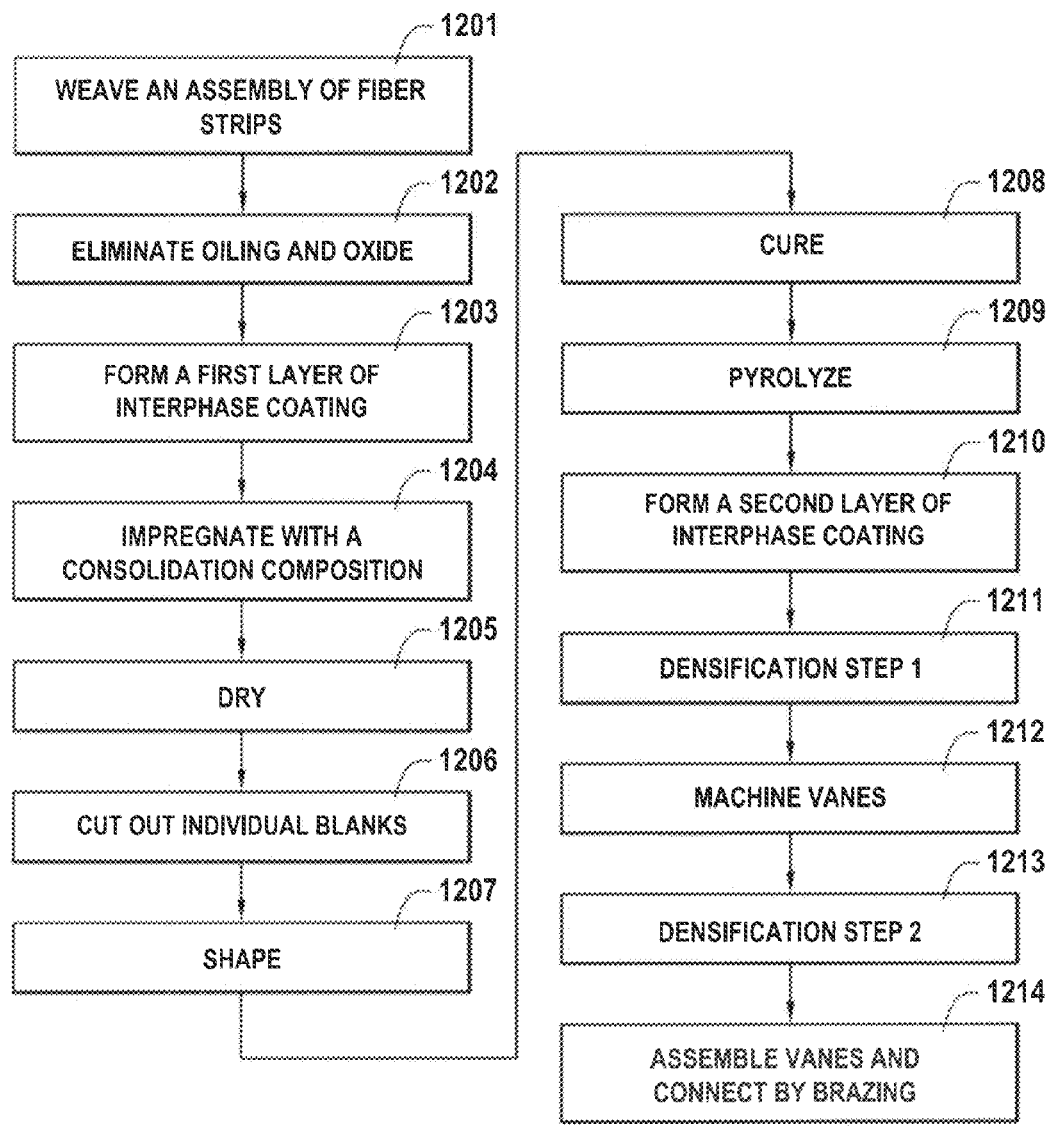
Figure 27:
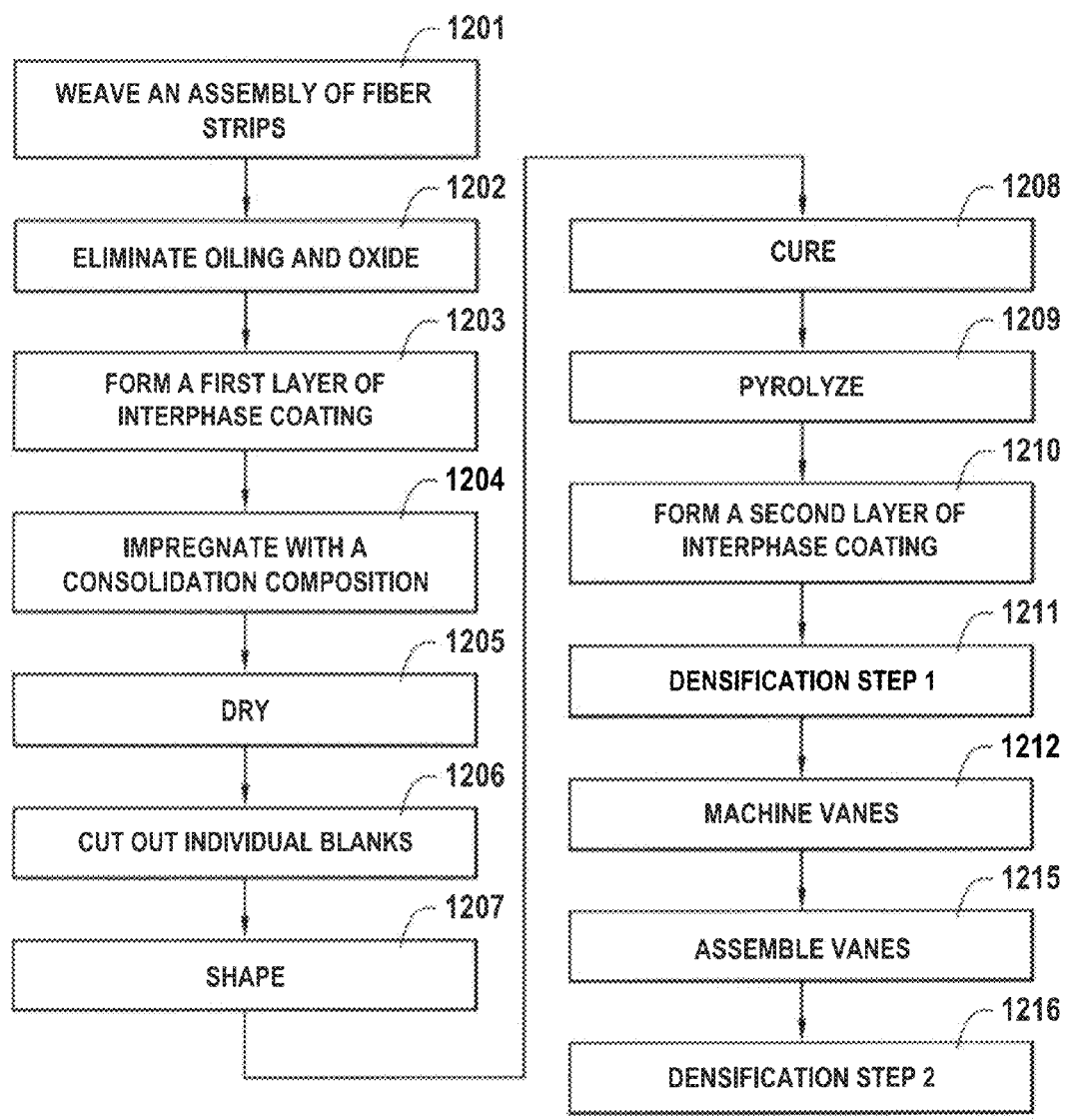
Figure 28:
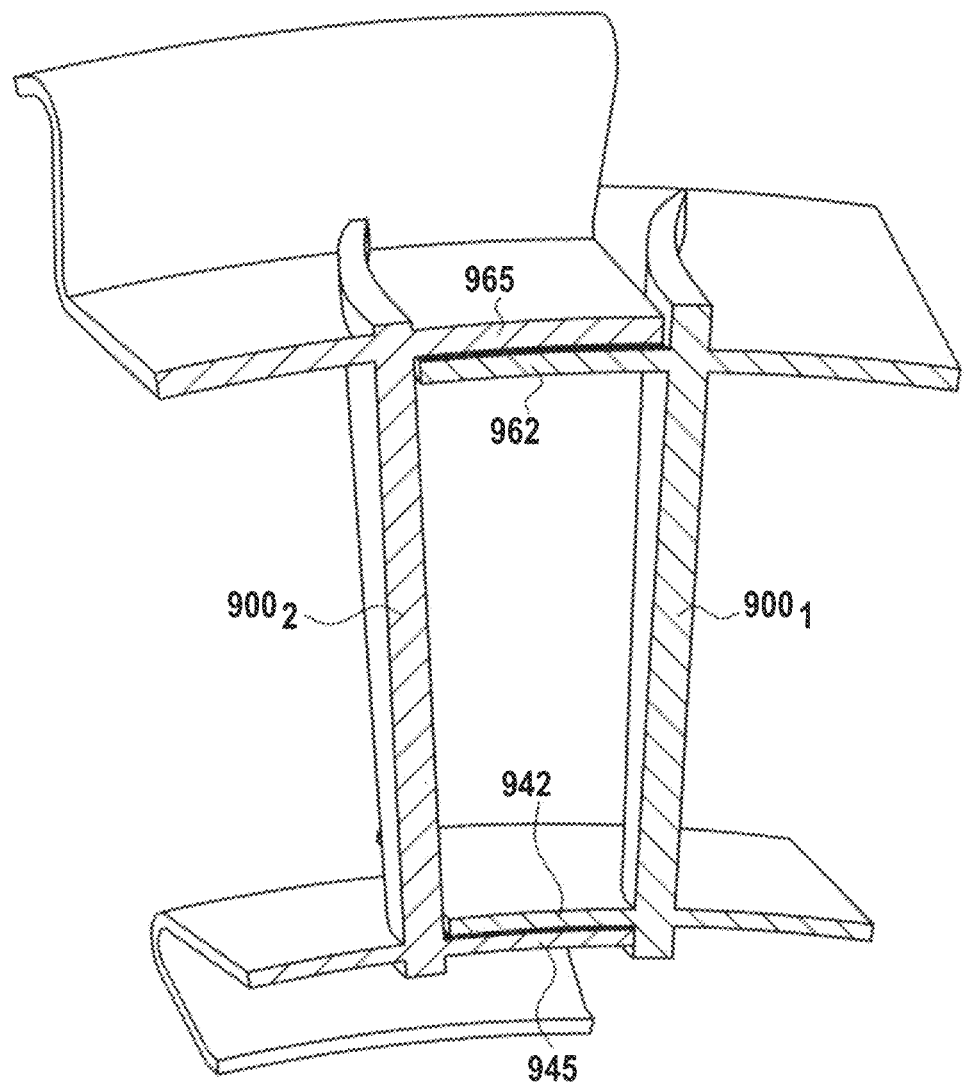
Figure 29:
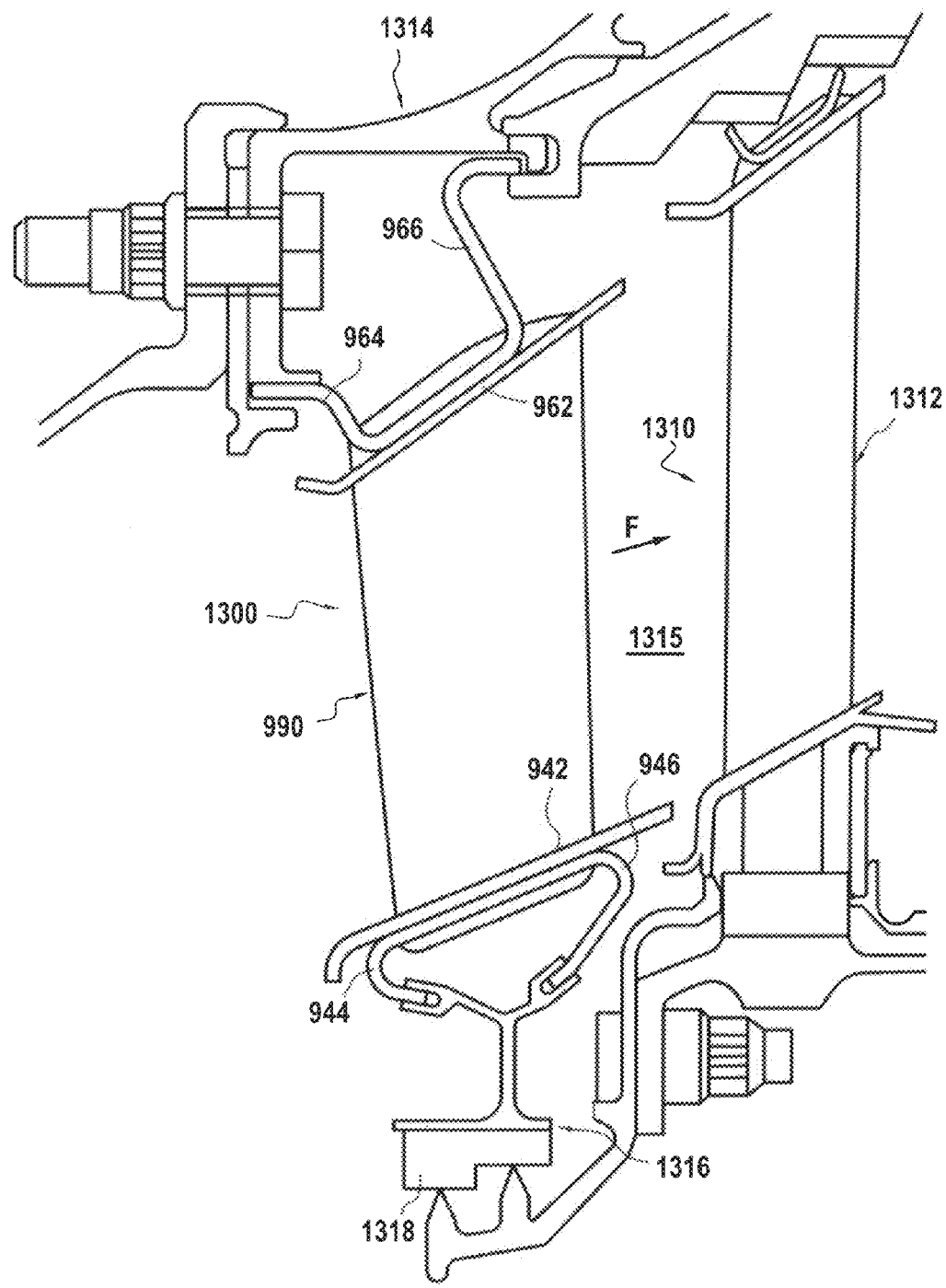
Figure 30:
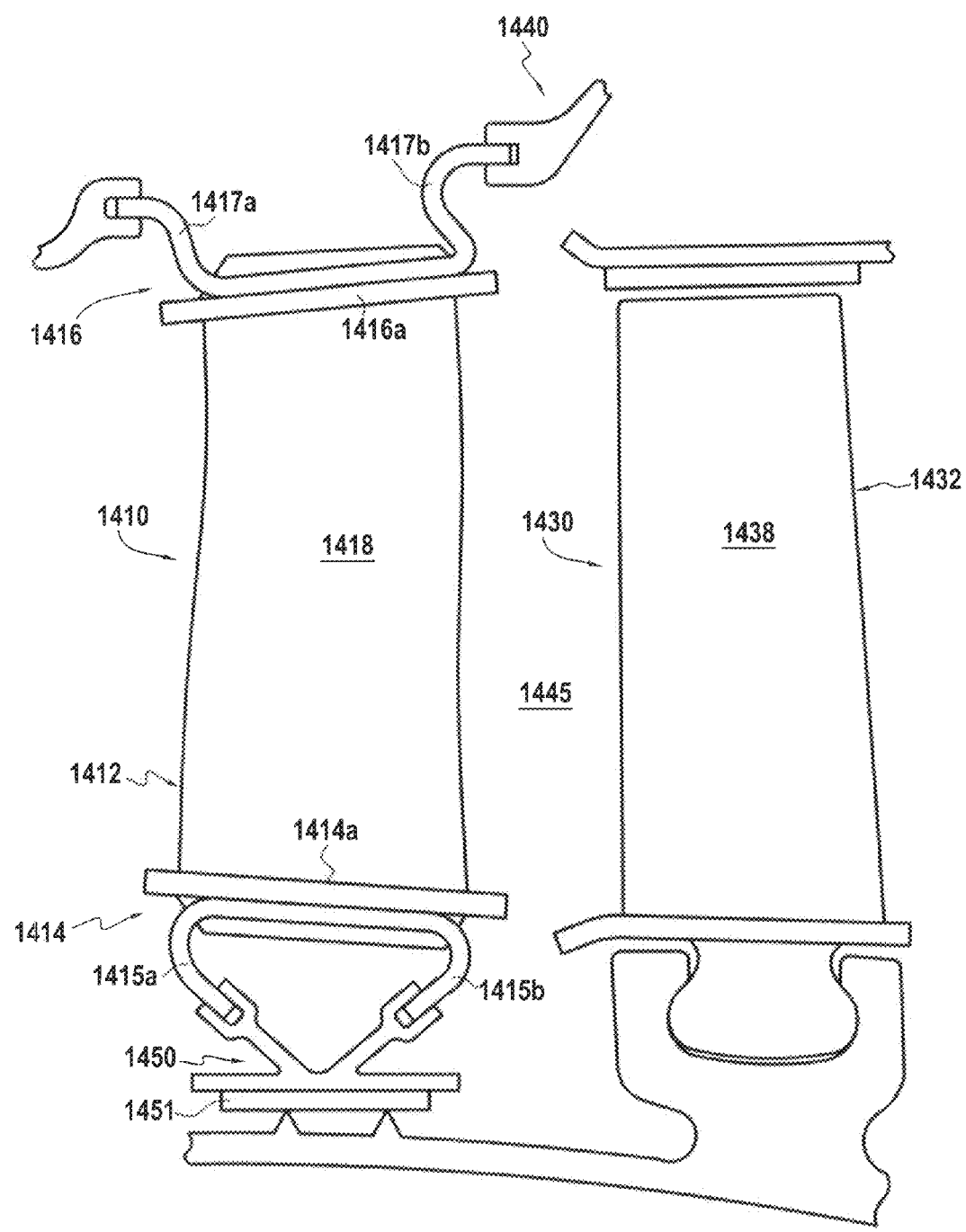

3 corresponding to the location of the junction between the airfoil and the blade outer platform spoiler or wiper plate;

FIG. 12B is a partial section view in a portion of the of the fiber blank of FIG. 3 corresponding to the location of the junction between the airfoil and the blade outer platform spoiler or wiper plate;

FIG. 13A is a weft section view showing an example of an arrangement of weft yarns in a portion of the fiber blank corresponding to a portion of the airfoil root;

FIGS. 13B through 13D are weft section views showing warp planes for a three-dimensional (multilayer) weaving example in the fiber blank portion of FIG. 13A;

FIG. 14 is a partial schematic section view showing another embodiment of a blank portion corresponding to an airfoil root;

FIGS. 15 and 16 illustrate very schematically two embodiments of a woven fiber strip obtained by three-dimensional weaving including a plurality of fiber blanks like that of FIG. 3;

FIG. 17 indicates successive steps of an embodiment of a manufacturing method for a turbomachine blade in conformity with the invention;

FIG. 18 indicates successive steps of another embodiment of a manufacturing method for a turbomachine blade in conformity with the invention;

FIG. 19 shows the assembly to a turbomachine rotor of a plurality of blades similar to those of FIGS. 1 and 2;

FIG. 20 is a perspective view of a first and a second turbomachine vane in conformity with one embodiment of the invention;

FIG. 21 is a highly diagrammatic representation of the disposition of two sets of layers of yarns in a three-dimensional woven fiber blank for use in making a fiber preform for one vane shown in FIG. 20;

FIGS. 22, 23 and 24 show successive steps in making a fiber preform for one vane shown in FIG. 20, starting from the fiber blank of FIG. 21;

FIG. 25 is a perspective view of a turbine nozzle segment obtained by connecting together a plurality of first and second vanes such as shown by FIG. 20;

FIG. 26 shows successive steps in an implementation of a method of making a turbomachine nozzle segment in accordance with the invention;

FIG. 27 shows successive steps in another implementation of a method of making a turbomachine nozzle segment in accordance with the invention;

FIG. 28 is a partial view in cross-section of the turbine nozzle segment of FIG. 25;

FIG. 29 is a very diagrammatic and partial half axial section view of a low-pressure turbine of a turbomachine comprising a turbine nozzle in CMC material; and FIG. 30 is a very, diagrammatic and partial half axial section view of a compressor of a turbomachine comprising a compressor stator in CMC material.

DETAILED DESCRIPTION OF EMBODIMENTS

First Embodiments

Turbomachine Blades

The invention is applicable to different types of turbomachines with integrated inner platforms and/or outer platforms, particularly compressor and turbine blades of different gas turbine bodies, for example a low pressure (BP) turbine rotor blade, like those illustrated FIGS. 1 and 2.

FIG. 1 illustrates a first blade 100 which includes, in well-known manner, an airfoil 120, a root 130 consisting of a portion having greater thickness, for example with a bulb-shaped section, continuing with a tang 132. The airfoil 120 extends in the longitudinal direction between its root 130 and its tip 121 and has a dished profile in transverse section with variable thickness defining two surfaces 122 and 123, corresponding respectively to the upper surface and to the lower surface of the airfoil 120 and each connecting the leading edge 120a and the trailing edge 120b of the last mentioned.

The blade 100 is assembled onto a turbine rotor (not illustrated) by inserting the root 130 into a marching shape recess provided in the periphery of the rotor.

In conformity with one embodiment of the invention, the airfoil 120 also includes a blade inner platform 140 and a blade outer platform spoiler plate 160.

More precisely, at its radially inward end, the airfoil 120 connects to the blade inner platform 140 the outer (or upper) surface 142 whereof defines, radially inside, the flow passage of a gas stream f. In its upstream and downstream end portions (in the direction f of the gas stream flow), the inner platform 140 terminates in covering spoilers 144 and 146. In addition, between its upstream and downstream end portions, the inner platform 140 exhibits a hollowed portion 147 on its edge located on the side of the surface 123 of the airfoil 120, the shape of the hollowed portion 147 being defined so as to cooperate with the surface 222 (upper surface) of the blade 200 described hereafter and with which the blade 100 is designed to cooperate. On its opposite edge, that is the one present on the side 122 of the airfoil 120, the inner platform 140 exhibits a projecting portion 148 the shape whereof is defined so as to cooperate with the surface 223 (lower surface) of the airfoil 200 described hereafter and with which the blade 100 is designed to cooperate.

In the example illustrated, the surface 142 of the inner platform is substantially perpendicular to the longitudinal direction of the blade. Depending on the desired profile of the inner surface of the flow passage of the gas stream, the surface 142 of the inner platform can also be tilted, making a generally nonzero angle relative to the normal to the longitudinal direction of the blade, or the surface 142 could have a generally non-rectilinear profile, dished for example.

The blade 120 also connects at its radially outward end to a blade outer platform spoiler plate 160 which defines on its inner (lower) surface 161, radially outward, the flow passage of the gas stream f. In its upstream and downstream end portions, the blade outer platform spoiler plate 160 ends in covering spoilers 162 and 163.

In addition, between its upstream and downstream end parts, the blade outer platform spoiler plate 160 exhibits a hollowed portion 164 on its edge located on the side of the surface 123 of the airfoil 120, the shape of the hollowed portion 164 being defined so as to cooperate with the surface 222 (upper surface) of the airfoil 200 described hereafter and with which the airfoil 100 is designed to cooperate. On its opposite edge, that is the one present on the side 122 of the airfoil 120, the blade outer platform spoiler plate 160 exhibits a projecting portion 165 the shape whereof is defined so as to cooperate with the surface 223 (lower surface) of the airfoil 200 described hereafter and with which the airfoil 100 is designed to cooperate.

In the example illustrated, the surface 161 of the blade outer platform spoiler plate 160 extends substantially perpendicularly to the longitudinal direction of the blade. As a variant, depending on the desired profile of the outer surface of the flow passage of the gas stream, the surface 161 could be tilted, making a generally nonzero angle relative to the normal to the longitudinal direction of the blade or the surface 161 could have a generally non-rectilinear profile, dished for example.

Further, the airfoil 120 lacks an anti-tilting wall at its radially inward end and blade outer platform wipers at its radially outward end.

FIG. 2 illustrates a second blade 200 designed to cooperate with the blade 100 and which includes an airfoil 220, a root 230 constituted by a portion having greater thickness, having for example a bulb-shaped section, continuing in a tang 232. The airfoil 200 extends in a longitudinal direction between its root 230 and its tip 221 and exhibits in cross-section a dished profile with variable thickness defining two surfaces 222 and 223, corresponding respectively to the upper surface and to the lower surface of the airfoil 200 and each connecting the leading edge 220a and the trailing edge 220b of the latter. The blade 200 is mounted onto a turbine rotor (not illustrated) by inserting the root 230 into a recess of matching shape provided in the periphery of the rotor.

In conformity with one embodiment of the invention, at its radial end, the airfoil 220 connects to an anti-tilting wall 250 which comprises at its upstream and downstream ends flanks 251 and 252 capable of preventing tilting of the blade when the latter is mounted on the turbine rotor.

Between its upstream and downstream ends, the anti-tilting wall 250 exhibits a hollowed portion 253 on its edge located on the side of the surface 223 of the airfoil 220, the shape of the hollowed portion 253 being defined so as to cooperate with the surface 122 (upper surface) of the airfoil 100 described previously and with which the blade 200 is designed to cooperate. On its opposite edge, that is the one present on the side 222 of the airfoil 220, the anti-tilting wall 250 exhibits a projecting portion 254 the shape whereof is defined so as to cooperate with the surface 123 (lower surface) of the airfoil 100 described hereafter and with which the blade 200 is designed to cooperate.

In addition, at its radially outward end, the airfoil 220 connects to a blade outer platform wiper plate 270. On its outer (upper) surface 272, the blade outer platform wiper plate 270 defines a depression or bathtub 273. Along the upstream and downstream edges of the bathtub 273, the plate 270 bears wipers 274 and 275 having tooth-shaped profiles, the tips whereof can penetrate into a layer of abradable material of a turbine ring (not shown) to reduce the clearance between the blade tip and the turbine ring.

The central portions of the anti-tilting wall 250 and of the blade outer platform wiper plate 270 extend substantially perpendicularly to the longitudinal direction of the blade. As a variant, depending on the desired profile of the outer surface of the flow passage of the gas stream, the central portions of these elements could be tilted, forming a generally nonzero angle relative to the normal to the longitudinal direction of the blade or could have a generally non-rectilinear profile, dished for instance.

Furthermore, the airfoil 220 lacks an inner platform at its radially inward end and a blade outer platform spoiler plate at its radially outward end, these two elements being assembled onto the airfoil 200 during its assembly to airfoils 100 as explained hereafter.

Thus, with its inner platform 140 and its blade outer platform spoiler plate 160, the blade 100 provides the function of defining the passage while, with its anti-tilting wall 250 and its blade outer platform wiper plate 270, the blade 200 provides the anti-tilting and sealing functions.

FIG. 3 shows very schematically a fiber blank 300 starting from which a fiber blade preform can be shaped in order to obtain, after densification by a matrix and possible machining, a blade made of composite material having an integrated inner platform and outer platform spoiler plate like the blade 100 illustrated by FIG. 1.

The blank 300 consists of two portions 302, 304 obtained by three-dimensional weaving or multilayer weaving, only the envelopes of these two portions being shown in FIG. 3. The portion 302 is designed, after shaping, to constitute a portion of a fiber blade preform corresponding to an airfoil and blade root preform, this portion exhibiting a surface 302a designed to constitute the lower surface of the airfoil and a surface 302b designed to constitute the upper surface of the airfoil. The portion 304 is designed, after shaping, to constitute the portions of a fiber blade preform corresponding to inner platform and blade outer platform spoiler plate preforms.

The two portions 302, 304 are in the form of strips extending generally in a' direction X corresponding to the longitudinal direction of the blade to be fabricated. The fiber strip 302 exhibits, in its portion designed to form a blade preform, a variable thickness determined according to the thickness of the airfoil profile of the blade to be fabricated. In its portion designed to constitute a root preform, the fiber strip 302 exhibits an extra thickness 303 determined according to the thickness of the root of the blade to be fabricated.

The fiber strip 302 has a width 1 selected according to the length of the developed (flattened) profile of the airfoil and of the blade root to be fabricated, while the fiber strip 304 has a width L greater than 1 selected according to the developed lengths of the inner platform and of the outer platform spoiler plate of the blade to be fabricated (or of the anti-tilting wall and the blade outer platform wiper plate to be fabricated).

The fiber strip 304 has a substantially constant thickness determined according to the thicknesses of the inner platform and of the blade outer platform spoiler plate to be fabricated (or of the anti-tilting wall and the blade outer platform wiper plate). The strip 304 includes a first portion 304a which extends along and in vicinity of a first surface 302a (lower surface) of the strip 302, a second portion 304b which extends along and in the vicinity of the second surface 302b (upper surface) of the strip 302 and a third portion 305a which extends along and in the vicinity of the first face 302a of the strip 302.

The portions 304a and 304b are by a connection portion 304c which extends transversely relative to the strip 302 at a location corresponding to that of the inner platform of the blade to be fabricated. The connection portion 340c runs through the strip substantially perpendicularly to the longitudinal direction of the fiber blank. The portions 304b and 305a are by a connection portion 350c which extends transversely relative to the strip 302 following a wavy profile at a location corresponding to that of the outer platform spoiler plate to be fabricated. Depending on the desired geometry at the outer platform spoiler plate of the blade, the connection portion 340c and/or the connection portion 350c can pass through the strip 302 forming a nonzero angle relative to the normal to the longitudinal direction X of the blank. In addition, the profile of the connection portion 340c and/or that of the connection portion 350c can be curvilinear instead of being rectilinear as in the example illustrated.

As described in greater detail later, the strips 302 and 304 are woven simultaneously by three-dimensional weaving, with no linkage between the strip 302 and the portions 304a, 304b and 305a of the strip 304, and by continuously weaving a plurality of successive blanks 300 in the X direction.

Figure 5:
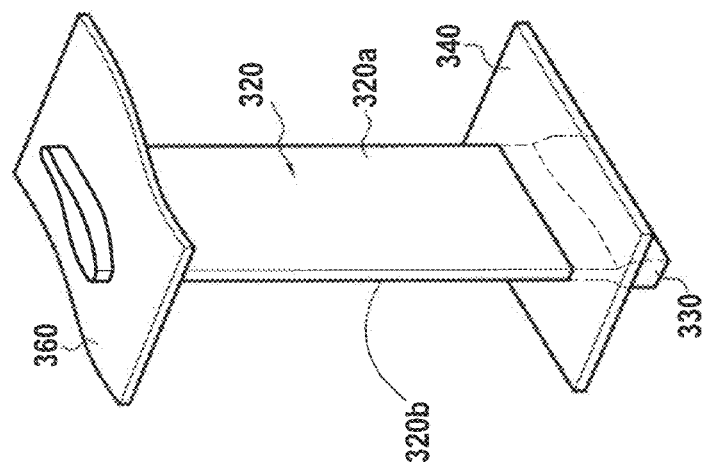
FIGS. 4 and 5 illustrate successive steps of the fabrication of a fiber preform for a blade such as that illustrated by FIG. 1, starting with the fiber blank of FIG. 3.
Figure 4:
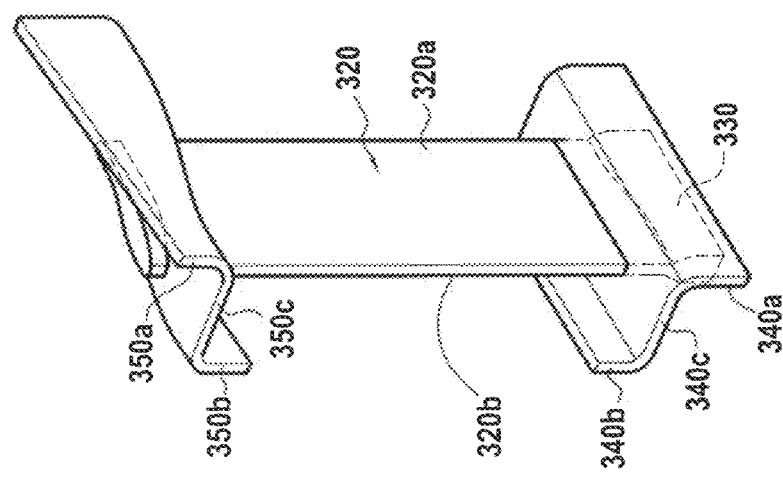
Figure 6:
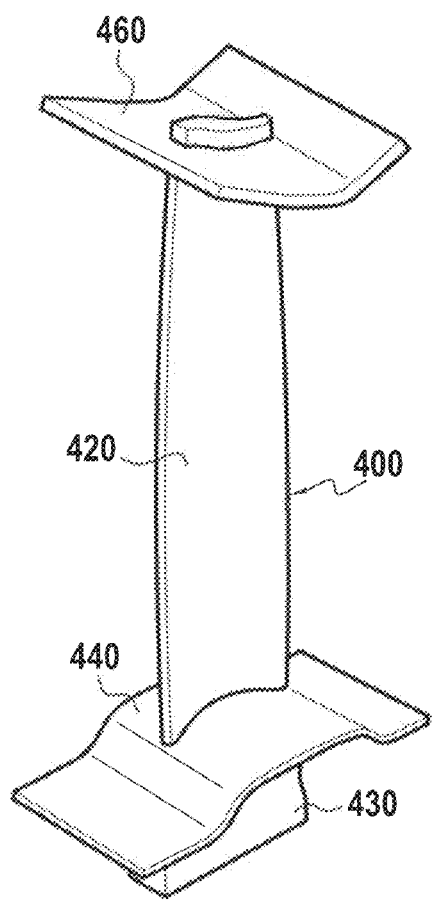
FIGS. 6 and 7 illustrate successive steps of the fabrication of a fiber preform for a blade such as that illustrated by FIG. 2, starting from the fiber blank of FIG. 3.

FIGS. 4 through 6 show very schematically how a fiber preform having a shape near to that of the blade to be fabricated can be obtained starting with the fiber blank 300.

The fiber strip 302 is cut at one end through the extra thickness 303 and at another end slightly beyond the connection portion 350c to have a strip 320 corresponding to the longitudinal dimension of the blade to be fabricated with a swollen portion 330 constituted by a portion of the extra thickness 303 and situated at a location corresponding to the position of the root of the blade to be fabricated. The strip 320 exhibiting a surface 320a designed to constitute the lower surface side of the airfoil and a surface 320b designed to constitute the upper surface side of the airfoil.

In addition, cutouts are made at the ends of the portions 304a, 305a of the strip 304 and in the portion 304b thereof to leave segments 340a and 340b remaining on either side of the connection portion 340c, and segments 350a and 350b on either side of the connection portion 350c, as shown by FIG. 4. The lengths of the segments 340a, 340b and 350a, 350b are determined according to the inner platform and outer platform spoiler plate lengths in the blade to be fabricated.

Due to the absence of linkage between the strip 302 of the fiber blank, on the one hand, and the portions 304a, 304b and 305a, on the other, the segments 340a, 340b, 350a and 350b can be folded perpendicularly to the strip 302 without cutting yarns to form plates 340, 360, as shown by FIG. 5.

A fiber preform 400 of the blade to be fabricated is then obtained by molding with deformation of the strip 302 to reproduce the dished profile of the blade airfoil and deformation of the plates 340, 360 to reproduce shapes similar to those of the inner platform and of the blade outer platform spoiler plate, as shown by FIG. 6. A preform is thus obtained having It is assumed that the weaving is performed with warp yarns extending in the longitudinal direction X of the blank, it being specified that weaving with weft yarns in this direction is also possible.

The variation of thickness of the strip 302 over its width is obtained by using warp yarns having variable weight. As a variant or additionally, it is possible to vary the count of the warp yarns (number of yarns per unit length in the weft direction), a lower count allowing greater thinning during the shaping of the preform by molding.

Thus, to obtain a blade airfoil profile such as that shown in flattened projection in FIG. 8, 3 layers of warp yarns having variable weight and count can be used as illustrated by FIG. 9.

In one example of implementation, the yarns used can be silicon carbide (SiC) yarns supplied under the name of "Nicalon" by the Japanese company Nippon Carbon and having a weight (number of filaments) of 0.5K (500 filaments).

The warp is made with 0.5K SiC yarns and 1K SiC yarns obtained by combining two 0.5K yarns, the two yarns being combined by covering. The covering is advantageously performed with a yarn of a temporary nature capable of being eliminated after weaving, for example a yarn made of polyvinyl alcohol (PVA) that can be eliminated by dissolving it in water.

Table I below specifies, for each column of warp yarns, the count (number of yarns/cm in the length of the profile), the number of 0.5K yarns, the number of 1K yarns and the thickness of the profile in mm, this varying here between approximately 1 mm and 2.5 mm:

TABLE I

| Column | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|
| Count | 6 | 6 | 6 | 6 | 6 | 6 | 6 | 8 | 8 | 8 | 8 | 8 | 8 | 8 | 8 | 8 | 8 | 8 | 6 |
| No of 0.5K yarns | 3 | 3 | 3 | 3 | 3 | 3 | 3 | 2 | 1 | 0 | 0 | 0 | 0 | 0 | 0 | 0 | 2 | 1 | 3 |
| No of 2 × 0.5K yarns | 0 | 0 | 0 | 0 | 0 | 0 | 0 | 1 | 2 | 3 | 3 | 3 | 3 | 3 | 3 | 3 | 1 | 2 | 0 |
| Thickness | 1 | 1 | 1 | 1 | 1 | 1 | 1.2 | 1.5 | 2 | 2.2 | 2.4 | 2.5 | 2.4 | 2.4 | 2.2 | 2.1 | 1.8 | 1.5 | 1.2 | an airfoil preform portion 420, a root preform portion 430 (with tang preform) and inner platform preform and outer platform preform portions 440, 460.

Figure 7:
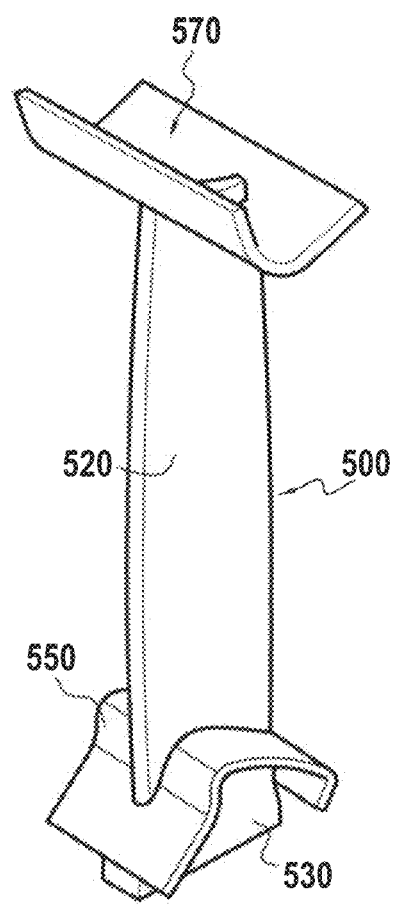

FIG. 7 shows very schematically a fiber preform 500 making it possible to obtain, after densification by a matrix and possibly machining, a blade made of composite material having an integral anti-tilting wall and outer platform wiper plate like the blade 200 illustrated by FIG. 2. The preform 500 is obtained by three-dimensional weaving or multilayer weaving in three portions and cutting out these portions in segments as already described earlier in relation to FIGS. 3 through 5, and by molding with deformation of the strip to reproduce the dished profile of the blade airfoil and deformation of the lower and upper plates to reproduce shapes similar to those of the anti-tilting wall and of the outer platform wiper plate, as shown by FIG. 7. A preform 500 is thus obtained with an airfoil preform portion 520, a root preform portion 550 (with tang preform) and anti-tilting wall preform and outer platform wiper plate preform portions 550, 570.

As described later, the steps in fabricating a blade preform starting with a fiber blank are advantageously performed after treatment of the fibers of the blank and its impregnation with a consolidation compound.

A method of three-dimensionally weaving the fiber blank 300 will now be described in greater detail.

Naturally, depending on the available yarn weights, different combinations of numbers of yarn layers and of variations of count and of weight could be adopted for the profile to be obtained.

FIGS. 10A, 10B show, in warp section, two successive planes of a weave that can be used for weaving the fiber blank 300 outside of the extra thickness 303.

The strip 302 of the fiber blank 300 includes a set of layers of warp yarns, the number of layers here being equal to 3 for example (layers $C_{11}$, $C_{12}$, $C_{13}$). The warp yarns are with weft yarns $t_1$ by three-dimensional weaving.

The strip 304 also includes a set of warp yarn layers also equal to 3 for example (layers $C_{21}$, $C_{22}$, $C_{23}$) with weft yarns $t_2$ by three-dimensional weaving, like the strip 302.

It is noted that the weft yarns $t_1$ do not extend into the warp yarn layers of the strip 304 and that the weft yarns $t_2$ do not extend into the warp yarn layers of the strip 302 in order to ensure that they are not linked together.

In the example illustrated, the weave is a multilayer weave performed with a satin or multi-satin type weave. Other three-dimensional weave types can be used, for example a multilayer weave with a multiple plain weave or weaving with an "interlock" type weave. The term "interlock weave" is used herein to mean a type of weave wherein each layer of weft yarns connects several layers of warp yarns with all the yarns of the same warp column having the same path in the plane of the weave.

Different three-dimensional weaving methods are described in particular in document WO 2006/136755.

FIG. 11A is a section view parallel to the warp and weft directions at the crossing of the strip 302 by the connection portion 340c of the strip 304 of the fiber blank of FIG. 3, the warp yarns of this connection portion being viewed in section. Each layer of warp yarns extends, in this connection portion 340c, in a direction perpendicular to the weft direction of the strip 302. The passage of the strip 304 from one side to the other of the strip 302 is provided, during weaving, by having each warp yarn of the strip 304 run through all the warp and weft yarns of the strip 302, individually.

FIG. 11B is a weft section view at the crossing of the strip 302 by the connection portion 340c of the strip 304 of the fiber blank FIG. 3. In the example illustrated, as already stated, the connection portion 340c extends perpendicularly to the warp direction of the strip 302. However it is possible to have a connection portion 350c which extends to as to form a non-zero angle relative to the normal to the warp direction, depending on the desired orientation of the blade outer platform spoiler plate (or of the outer platform wiper plate).

FIG. 12A is a section view parallel to the warp and weft directions at the crossing of the strip 302 by the connection portion 350c of the strip 304 of the fiber blank of FIG. 3, the warp yarns of this connection portion being viewed in section. Each layer of warp yarns extends, in this connection portion 350c, in a direction perpendicular to the weft direction of the strip 302 following a wavy profile.

FIG. 12B is a weft section view at the crossing of the strip 302 by the connection portion 350c of the strip 304. In the example illustrated, as stated previously, the connection portion 350c extends perpendicularly to the warp direction of the strip 302 following a wavy profile. However, as for the connection portion 340c, it is possible to have a connection portion 350c which extends rectilinearly while forming a nonzero angle relative to the normal to the warp direction, depending on the desired orientation of the blade outer platform spoiler plate (or of the outer platform wiper plate).

The extra thickness 303 can be obtained by using weft yarns with greater weight and supplementary layers of weft yarns, as shown for example by FIG. 13A.

On FIG. 13A, the number of layers of weft yarns changes in this example from 4 to 7 between a portion $302_1$ of the strip 302, corresponding to the tang of the blade and the portion $302_3$ of the strip 302 exhibiting the extra thickness 303.

In addition, weft yarns $t_1$, $t'_1$, $t''_1$ of different weights are used, the yarns $t_1$ being for example "Nicalon" SiC yarns with a weight of 0.5K (500 filaments), the yarns $t'_1$ being obtained by the combination of two 0.5K yarns and the yarns $t''_1$ by the combination of three 0.5K yarns.

The weave in the blank portion $302_3$ necessitates a greater number of warp thread layers than in the portion $302_1$. This is advantageously accomplished during the transition between the $302_1$ and the portion $302_3$ by reducing the number of warp planes by constituting each warp plane in the portion $302_3$ by combining warp yarns from two warp planes of the portion $302_1$. FIGS. 13B and 13C show two neighboring warp planes in the portion $302_1$ and FIG. 13D shows a warp plane obtained in the portion $302_3$ by combining the warp planes from FIGS. 13B and 13C. In FIGS. 13B, 13C and 13D, the different weights of the warp yarns (as shown in FIG. 9) or of the weft yarns (as shown in FIG. 13A) are not shown, for the sake of simplicity. Between FIGS. 13B, 13C, on the one hand, and FIG. 13D, on the other hand, the dashes show how the warp yarns of the different layers in FIGS. 13B, 13C constitute the warp yarn layers of FIG. 13D.

Of course, different combinations of numbers of weft layers and of weights of weft threads can be selected to constitute the extra thickness 303.

According to another embodiment shown schematically in FIG. 14, the extra thickness 303 can be obtained by introducing an insert during weaving of the strip 302.

In FIG. 14, the set $T_1$ of weft yarn layers of the portion $302_1$ of the strip 302 corresponding to the tang of the blade is divided by the absence of linkage during weaving into two subsets $T_{11}$, $T_{12}$ between which an insert $303_1$ is inserted. In the example illustrated, the portion $302_1$ has a greater thickness than that of the portion $302_2$ of the strip 302 corresponding to the airfoil of the blade. The transition between the portion $302_2$ and the portion $302_1$ can be fabricated in the same manner as described above for the transition between the portions $302_1$ and $302_3$ of FIG. 13A. The crossing of the strip 302 by the strip 304 at the connection portion 340c of FIG. 3 can possibly be accomplished through the portion $302_1$ having greater thickness.

At the end of the insert 303 opposite to the portion $302_1$, the subsets $T_{11}$, $T_{12}$ of weft yarn layers are again woven together to constitute a portion $302'_1$ having the same thickness as the portion $302_1$, then, by thickness reduction, a portion $302'_2$ having the same thickness as the portion $302_2$, the portion $302'_2$ constituting the portion corresponding to a blade airfoil for the following woven blank.

The insert $303_1$ is preferably made of monolithic ceramic, preferably the same ceramic material as that of the matrix of the composite material of the blade to be fabricated. Thus, the insert $303_1$ can be a block of SiC obtained by sintering SiC powder.

As shown very schematically by FIG. 15, a plurality of fiber blanks 600 can be obtained by weaving a strip 300 wherein are formed one or more rows of successive fiber blanks. Some extra-length areas 610, 620 are provided in the warp direction (warp yarns only) and in the weft direction (weft threads only) to avoid edge effects connected with weaving, allow greater freedom to deform during shaping of the preform and provide transition areas between blanks 100.

FIG. 16 shows a variant of implementation according to which a strip 700 is fabricated with a row of blanks 300 woven in the weft direction perpendicular to the longitudinal direction of the strip. Extra-length areas 710, 720 are also provided in the warp direction and in the weft direction. Several rows of blanks 300 can be woven, the width of the strip 400 being adjusted for this purpose.

Successive steps of a fabrication method for a blade made of composite material according to one embodiment of the invention are indicated in FIG. 17.

At step 501, a fiber strip is woven by three-dimensional weaving that includes a plurality of fiber blanks, for example several rows of fiber blanks oriented in the warp direction, as shown in FIG. 15. For turbomachine blades designed for use at high temperature and particularly in a corrosive environment (particularly humidity), yarns made of ceramic fibers are used for weaving, particularly silicon carbide (SiC) fibers.

At step 502, the fiber strip is treated to eliminate oiling present on the fibers and the presence of oxide on the surface of the fibers. The elimination of oxide is obtained by acid treatment, particularly by immersion in a bath of hydrofluoric acid. If the oiling cannot be eliminated by the acid treatment, a prior treatment for eliminating oiling is carried out, for example by decomposition of the oiling by a brief heat treatment.

At step 503, a thin layer of interphase coating is formed on the fibers of the fiber strip by chemical vapor infiltration or CVI. The material of the interphase coating is for example pyrolytic carbon or pyrocarbon (PyC), boron nitride (BN) or boron-doped carbon (BC, with for example 5 atom percent (% at) to 20% at of B, the remainder being C). The thin layer of interphase coating is preferably of small thickness, for example equal at most to 100 nanometers, even equal at most to 50 nanometers, so as to retain a good ability to deform in the fiber blanks. Preferably, the thickness is at least equal to 10 nanometers.

At step 504, the fiber strip with the fibers coated with a thin layer of interphase coating is impregnated by a consolidation composition, typically a resin possibly diluted in a solvent. A carbon precursor resin can be used, for example a phenolic or furanic resin, or a ceramic precursor resin, for example a polysilazane or polysiloxane precursor of SiC.

After drying by eliminating the solvent, if any, from the resin (step 505), a pre-curing of the resin can be performed (step 506). Pre-curing, or partial crosslinking, makes it possible to increase the stiffness, hence the strength, while maintaining the capacity to deform needed for the fabrication of blade preforms.

At step 507, the fiber blanks are cut out, as illustrated by FIG. 4.

At step 508, a fiber blank thus cut out is shaped (as illustrated by FIGS. 5 through 7) and placed in a mold, made of graphite for example, for conforming of the airfoil and root preform portion and of the inner platform and outer platform preform portions.

Thereafter, the crosslinking of the resin is completed (step 509) and the crosslinked resin is pyrolyzed (step 510). The crosslinking and the pyrolysis can be concatenated by progressive elevation of the temperature in the mold.

After pyrolysis, a fiber preform consolidated by the pyrolysis residue is obtained. The quantity of consolidation resin is selected so that the pyrolysis residue binds the fibers of the preform sufficiently that it can be handled while retaining its shape without the help of tooling, it being specified that the quantity of consolidation resin is preferably selected as small as possible.

Steps consisting of elimination of oiling, of acid treatment and of formation of the interphase coating for a SiC fiber substrate are known. Reference can be made to document U.S. Pat. No. 5,071,679.

A second interphase coating is formed by CVI (step 511) in order to generally obtain a fiber-matrix interphase having sufficient thickness to provide its function of brittleness relief of the composite material. The second interphase layer can be made of a material selected from among PyC, BN, BC, not necessarily the same as that of the first interphase layer. The thickness of the second interphase layer is preferably at least equal to 100 nanometers.

The fabrication of an interphase in two layers, as indicated earlier, is preferred. It is described in the French patent application filed under No. 08 54937 by the applicant.

Densification by a matrix of the consolidated preform is then performed. For a turbomachine blade designed for use at elevated temperature, and particularly in a corrosive environment, the matrix is made of ceramic, for example SiC. The densification can be performed by CVI, in which case the formation of the second interphase layer and the densification by the matrix can be concatenated in the same oven.

Densification can be carried out in two successive steps (steps 512 and 514) separated by a step 513 consisting of machining the blade to the desired dimensions.

It will be noted that pre-machining can be carried out between steps 509 and 510, that is after crosslinking and before pyrolysis of the resin.

Successive steps of a method for manufacturing a blade made of composite material according to another embodiment of the invention are indicated in FIG. 18.

Step 601 consisting of three-dimensional weaving of a fiber strip including a plurality of fiber blanks and step 602 consisting of treating to eliminate oiling and oxide are similar to steps 501 and 502 of the fabrication method of FIG. 17.

At step 603, individual fiber blanks are cut out of the fiber strip, then each individual fiber blank is shaped in a mold or former (step 604) to obtain a fiber blade preform by forming of the airfoil and root preform and of the inner platform and outer platform preform portions.

At step 605, an interphase brittleness relief coating is formed by CVI on the fibers of the preform held in the former. The coating material is for example PyC, BN or BC as previously mentioned. The thickness of the coating is roughly one to a few hundred nanometers.

The preform still being held in the former, a consolidation of the preform by partial densification is carried out (step 606), the consolidation being performed by formation of a ceramic deposit on the fibers by CVI.

The formation of the interphase coating by CVI and the consolidation by ceramic deposit by CVI can be concatenated in the same CVI oven.

The former is preferably of graphite and exhibits holes facilitating the passage of reactive gas phases giving the interphase deposit and the ceramic deposit by CVI.

When the consolidation is sufficient that the preform can be handled while still maintaining its shape without the assistance of holding tooling, the consolidated preform is extracted from the former and densification by a ceramic matrix is carried out. The densification can be performed in two successive steps (steps 607 and 609) separated by a step 608 consisting of machining the blade to the desired dimensions.

In the foregoing, the fabrication of a variable thickness airfoil profile has been considered, based on the use of yarns with variable weight and/or count. It is possible, as a variant, to fabricate the portion of the fiber blank corresponding to the airfoil preform portion with a certain number of layers of yarns of the same weight and with a constant count, the variation of thickness of profile being accomplished during machining after the first densification step or during a pre-machining of the consolidated blade preform.

Further, depending on the conditions of use contemplated for the blade, the fibers of the fiber reinforcement can be made of a material other than a ceramic, of carbon for example, and the matrix can be of a material other than a ceramic, for example carbon or a resin, the invention of course being also applicable to the manufacture of blades made of organic matrix composite materials.

FIG. 19 shows the assembly onto a rotor or turbomachine disk 800 of a plurality of blades 810, 820, 830, 840, 850 and 860, the blades 810, 830 and 850 exhibit a structure similar to the blade 100 of FIG. 1 while the blades 820, 840 and 860 exhibit a structure similar to the blade 200 of FIG. 2.

The blades 810, 820, 830, 840, 850 and 860 are assembled onto the rotor 800 by insertion of the roots 811, 821, 831, 841, 851 and 861 of each blade respectively into recesses 801, 802, 803, 804, 805 and 806 with a matching shape provided on the periphery of the rotor.

As described previously for the blade 100, the blades 810, 830 each 850 comprise respectively, at the radially inward of their airfoil 816, 836 and 856, an inner platform 812, 832 and 852 (including covering spoilers at its ends) while still lacking an anti-tilting wall that is customarily also present in this area. In addition, the blades 810, 830 and 850 each comprise respectively, at the radially outward end of their airfoil 816, 836 and 856, a blade outer platform spoiler plate 814, 834 and 854 while still lacking wipers that are customarily also present in this area.

Further, as described earlier for the blade 200, the blades 820, 840 and 860 each comprise respectively, at the radially inward end of their airfoil 826, 846 and 866, an anti-tilting wall 823, 843 and 863 while still lacking an inner platform that is customarily also present in this area. In addition, the blades 820, 840 and 860 each respectively comprise, at the radially outward end of their airfoil 826, 846 and 866, a blade outer platform wiper plate 825, 845 and 865 while still lacking spoilers that are customarily also present in this area.

As shown in FIG. 19, the blades nest with one another, the blades 820, 840 and 860 accommodating above their anti-tilting wall 823, 843 and 863 the inner platforms 812, 832 and 852 of the blades 810, 830 and 850. More precisely, each radially inward end of the blade airfoils of the same type as the blade 100 already described, for example the blade 820, is surrounded on the lower surface side of the airfoil, here the airfoil 826, by the hollowed portion 812a of the inner platform 812 of the blade 810, and on the upper surface side by the projecting portion 832b of the inner platform 832 of the blade 830. Thus it is possible to accommodate the radially inward end of an airfoil of a blade of the same type as the blade 200 already described between the inner platforms of two blades of the same type as the blade 100 already described and arranged on either side of the blade of the same type as the blade 200. The other portions of the edges of an inner platform situated on either side of the hollowed portion and of the projecting portion are in contact with the corresponding portions of the inner platforms of the adjacent blades so as to constitute a substantially continuous surface making it possible to define radially inward the flow passage of the gas stream.

Likewise, each radially outward end of the airfoils of blades of the same type as the blade 100 already described, for example the blade 820, is surrounded on the lower surface side of the airfoil, here the airfoil 826, by the hollowed portion 814a of the spoiler plate 814 of the blade 810 and on the upper surface side by the projecting portion 834b of the spoiler plate 834 of the blade 830. Thus, it is possible to accommodate the radially outward end of an airfoil of a blade of the same type as the blade 200 already described between the spoiler plates of two blades of the same type as the blade 100 already described and arranged on either side of the blade of the same type as the blade 200. The other portions of the edges of the blade outer platform spoiler plates located on either side of the hollowed portion and of the projecting portion are in contact with the corresponding parts of the spoiler plates of the adjacent blades so as to constitute a substantially continuous surface making it possible to define radially outward the flow passage of the gas stream. In other words, the passage definition function is provided by the combination of the inner platforms 812, 832 and 852 and of the outer platform spoiler plates 814, 834 and 854.

The combination of the blade outer platform wiper plates 825, 845 and 865 constitutes a continuous wall of wipers above the blade outer platform spoiler plates, thus providing a sealing function.

In the example considered here, the edges of adjacent anti-tilting walls do not meet. However, the edges of these walls can be extended and exhibit complementary shapes so as to form a continuous wall under the inner platforms.

The distance D1 between the inner platforms 812, 832 and 852 and the spoiler plates 814, 834 and 854 of the blades 810, 830 and 850 is less than the distance D2 between the anti-tilting walls 823, 843 and 863 and the blade outer platform wiper plates 825, 845 and 865 of the blades 820, 840 and 860 in order to allow their nesting with one another.

A set of blades according to the invention can consist of a first blade and a second blade, respectively of the same type as the blade 100 and of the blade 200 described previously.

The blade 100 described previously in relation to FIG. 2 includes an inner platform 140 and a blade outer platform spoiler plate 160 while still lacking an anti-tilting wall and blade outer platform spoilers while the blade 200 includes an anti-tilting wall 150 and a blade outer platform wiper plate 170 while still lacking an inner platform and blade outer platform spoilers.

According to variants of implementation, a first blade of the blade set according to the invention can includes an inner platform and a blade outer platform spoiler plate and be lacking an anti-tilting wall and a blade outer platform spoiler plate while the second blade of the blade set can include an anti-tilting wall and a blade outer platform spoiler plate and be lacking an inner platform and a blade outer platform wiper plate.

Second Embodiment

CMC Vanes for Turbine Nozzle Segment

The invention is also applicable to various types of turbomachine vanes with incorporated inner and outer platforms, in particular vanes to be assembled together for forming segments of turbine nozzles, e.g. vanes for forming segments of a nozzle of a low-pressure (LP) turbine, such as the single-airfoil vanes $900_1$, $900_2$ shown in FIG. 20, a turbine nozzle segment being obtained by assembling first vanes $900_1$ in alternation with second vanes $900_2$.

The first vanes $900_1$ comprise an inner platform limited to a flowpath delimiting inner platform portion 942, an outer platform limited to a flowpath delimiting outer platform portion 962, and an airfoil 920 extending between the platforms and formed integrally therewith.

The second vanes $900_2$ comprise an inner platform limited to an assembly of two hooks 944, 946 connected by a base portion 945, an outer platform limited to an assembly of two hooking legs 964, 966 connected by a base portion 965, and an airfoil 920 extending between the platforms and formed integrally therewith.

The terms "inner" and "outer" are used with reference to the position or orientation with respect of the turbine axis. The terms "flowpath delimiting platform portion" designates an inner or outer platform portion delimiting the passage for a gas flow through the turbine.

A method of fabricating a vane such as the vane $900_1$ of FIG. 20 will now be described with reference to FIGS. 21 to 24.

FIG. 21 is a highly diagrammatic view of a fiber blank 1000 which comprises two portions 1002 and 1004 obtained by three-dimensional weaving or multilayer weaving, only the envelopes of these two portions 1002, 1004 being shown. After being shaped, the portion 1002 is to constitute a preform portion for the airfoil 920. After being shaped, the portion 1004 is to constitute preform portions for the flowpath delimiting inner and outer platforms portions 942, 962.

The two portions 1002 and 1004 are in the form of strips extending generally in a direction X that corresponds to the longitudinal direction of the vane that is to be made. The weaving if for example performed with warp yarns extending in the direction X, it being specified that it is also possible to perform weaving with weft yarns extending in this direction. In each portion 1002, 1004, the warp yarns are arranged in a plurality of layers of yarns which are at least partially linked together by weft yarns of a plurality of layers of weft yarns. Various weaves may be used, for example interlock type, multi-satin type or multi-plain type weaves. Reference may be made to document WO 2006/136755.

The strip 1002 may present a varying thickness that is determined as a function of the profile of the airfoil of the vane that is to be made and has a width selected as a function of the length of the flat developed profile of the airfoil. Variation in the thickness of the strip 1002 along its length is obtained by using warp yarns of varying weight. In a variant, or in addition, it is possible to vary the count of the warp yarns (number of yarns per unit length in the weft direction), a smaller count making greater thinning possible when shaping the preform.

The strip 1004 is of substantially constant thickness determined as a function of the thickness of the flowpath delimiting inner and outer platform portions of the vane to be made. The strip 1004 has a width corresponding to the longer flat developed profile of the flowpath delimiting inner and outer platform portions. The strip 1004 has a first portion 1004a extending along and beside a first face 1002a of the strip 1002, a second portion 1004b extending along and beside the second face 1002b of the strip 1002, and a third portion 1005a extending along and beside the first face 1002a of the strip 1002.

The portions 1004a and 1004b of the strip 1004 are connected together by a connection portion 1040c that crosses the strip 1002 at a first crossing location which is located at a level corresponding to the location of the flowpath delimiting inner platform portion of the vane to be made. The portions 1004b and 1005a of the strip 1004 are connected together by a connection portion 1060c that crosses the strip 1002 at a second crossing location which is located at a level corresponding to the location of the flowpath delimiting outer platform portion of the vane to be made. In addition, the connection portions 1040c, 1060c cross the strip 1002 forming non-zero angles relative to a plane normal to the direction X, in order, in the example shown, to respect the geometry of the vane to be made at the level of the inner and outer platforms.

The strips 1002 and 1004 are woven simultaneously without any linking between the strip 1002 and the portions 1004a, 1004b, and 1005a of the strip 1004. A plurality of successive blanks 1000 may be woven continuously in the direction X. It is also possible to weave simultaneously a plurality of parallel rows of blanks 1000.

FIGS. 22 to 24 show highly diagrammatically how a fiber preform 1100 of shape close to that of the vane 900₁ that is to be made can be obtained from the fiber blank 1000.

In the longitudinal direction, the strip 1002 is cut at two ends to leave a portion 1008 for the making of a preform of the airfoil of the vane to be made, which portion is extended at its ends to form an inner extension 1024 and an outer extension 1026 (FIG. 22).

The strip 1004 is cut to leave a segment 1040a on the side of the first crossing location which is located on the face 1002a of the strip 1002, a segment 1040b on the side of the first crossing location which is located on the face 1002b of the strip 1002, a segment 1060b on the side of the second crossing location which is located on the face 1002b of the strip 1002 and a segment 1060a on the side of the second crossing location which is located on the face 1002a of the strip 1002.

The lengths of the segments 1040a and 1040b and of the segments 1060a and 1060b are selected as a function of the width of the flowpath delimiting inner and outer platform portions of the vane to be made.

Because there is no linking with the strip 1002, the segments 1040a and 1040b may be folded out on the opposite sides of the portion 1008, as well as the segments 1060a and 1060b, forming plates 1040 and 1060 (FIG. 23). After possible cutting of end portions, the lengths of the plates 1040, 1060 correspond respectively to the lengths of the flat developed profiles of the flowpath delimiting inner and outer platform portions of the vane to be made. The width of the strip 1004 if thus selected as a function of the larger of the lengths to be given to the plates 840 and 860.

The fiber preform 1100 of the vane to be made is subsequently obtained by molding within a shaping tool with the portion 1008 being deformed to obtain the profile of the airfoil 920 of the vane, and the plates 1040, 1060 being deformed to obtain forms respectively similar to the ones of the flowpath delimiting inner and outer platform portions 942, 962 of the vane to be made. A vane preform 1100 is thus obtained (FIG. 24) with preforms 1142, 1162 of the flowpath delimiting inner and outer platform portions 942, 962, and airfoil preform portion 1120.

A preform of a second vane 900₂ is obtained in the same way as a preform of a first vane 900₁.

A turbine nozzle segment 990 such as shown by FIG. 25 is obtained by assembling and connecting together unitary vanes similar to the ones of FIG. 20 and obtained by densifying the vane preforms, first vanes 900₁ alternating with second vanes 900₂. It shall be noted that the steps for shaping a vane preform 1100 from a fiber blank 1000 may be carried out after the fibers of the fiber blank 1000 have been processed and impregnated with a consolidation resin such as now described with reference to FIG. 26 which shows successive steps of a method for fabricating a multi-airfoil turbine nozzle segment in CMC material.

In step 1201, an assembly of fiber strips is woven by three-dimensional weaving, comprising a plurality of fiber blanks 700 oriented for example in the warp direction, as shown by FIG. 16. Weaving is performed with yarns made of ceramic material or carbon.

In step 1202, the assembly of fiber strips is processed to eliminate the oiling and oxide present on the fibers.

In step 1203, a thin layer of interphase coating is formed on the fibers of the fiber strip by chemical vapor infiltration (CVI). The interphase coating material is constituted for example by pyrolytic carbon (PyC), boron nitride (BN), or boron-doped carbon (BC). The thickness of the formed layer is preferably comprised between 10 nanometers and 100 nanometers.

Steps of fiber processing and of formation of interphase coating are described in U.S. Pat. No. 5,071,679.

In step 1204, the assembly of fiber strips is subsequently impregnated with a consolidation composition, typically a carbon precursor resin or a ceramic precursor resin that might optionally be dissolved in a solvent.

After drying (step 1205), the individual fiber blanks are cut out (step 1206), as shown in FIG. 21.

In step 1207, a fiber, blank as cut out in this way is shaped (as shown in FIGS. 22 and 23) and placed in a tooling, e.g. a graphite tooling, for shaping the airfoil preform portion, the preform portions for the platform portions forming gas passage inner and outer wall portions and the hooks and hooking legs preform portions.

Thereafter, the resin is cured (step 1208) and the pyrolyzed (step 1209). Curing and pyrolyzing can follow one another by progressively raising the temperature in the mold.

After pyrolysis, a fiber preform is obtained that has been consolidated by the residue of the pyrolysis. The quantity of consolidation resin is selected so that the pyrolysis residue bonds the fibers of the preform together sufficiently to enable the preform to be handled while conserving its shape and without assistance from tooling. A second interphase layer is formed by CVI (step 1210).

The second interphase layer may be of a material selected from PyC, BN, and BC, and its thickness is preferably not less than 100 nm. Making an interphase out of two layers is described in document EP 2,154,119.

Thereafter the consolidated preform is densified with a ceramic matrix for example by CVI. The matrix may be made of SiC or may be a self-healing matrix comprising matrix phases of pyrolytic carbon PyC, of boron carbide $B_4C$ or of a ternary system Si—B—C as described in particular in U.S. Pat. Nos. 5,246,756 and 5,965,266. Other types of matrix materials may be used, in particular refractory oxides, e.g. alumina, in particular for CMC materials of the oxide/oxide type. Densification may then be performed by a liquid process, namely by impregnation with a liquid precursor of the matrix material and transformation of the precursor by heat treatment or impregnation by a composition containing ceramic powder, the matrix being then obtained by sintering.

Densification is performed in two successive steps (steps 1211 and 1213) that are separated by a step 1212 of machining the vane to the desired dimensions. A vane is then obtained such as the one of FIG. 20.

The following step consists in assembling and connecting together a plurality of vanes to obtain a multi-airfoil CMC turbine nozzle segment such as the one of FIG. 25. The vanes are connected together by brazing along the longitudinal edges of the platform portions forming gas passage wall portions, and of the hooks and hooking legs. In a variant, brazing could be performed along overlapping portions of the platform portions forming gas passage wall portions. Brazing of pieces in CMC material is known. Reference may be made for instance to documents FR 2,664,518 and FR 2,745,808 the content of which is herein incorporated, these documents describing various nickel based brazing compositions containing also titanium, silicon and possibly other metals such as copper or chromium.

FIG. 27 shows successive steps of another method of fabricating a turbine nozzle segment in CMC material. Steps 1201 to 1212 are identical to those of the method of FIG. 26.

After the machining step 1212 a plurality of vanes are held together to form a nozzle segment (step 1215). The assembling of the vanes may be performed by means of a tooling maintaining the vanes side n by side and/or by pre-ceramic bonding, namely by bonding using a ceramic precursor resin, for example a polysilane, polysiloxane, polysilazane, polycarbosilane or silicone resin, as known in itself. A second densification or co-densification step is performed (step 1216) which is similar to step 1213 of the method of FIG. 26, but performed on a complete nozzle segment. When assembling by pre-ceramic bonding has been performed, the curing and the pyrolysis of the resin for transformation into ceramic may be performed during the temperature rising in view of the second densification step.

As shown by FIG. 28, the unitary vanes are assembled together by inserting:

the portion of a flowpath delimiting inner platform portion 942 located on one side (for example the suction face) of the airfoil of a first vane 900₁ above the portion of the base portion 945 located on the other side (hence pressure side) of the airfoil of an adjacent second vane 900₂ and, the portion of the flowpath delimiting outer platform portion 962 located on one side of the airfoil of the first vane 900₁ under the base portion 965 located on the other side of the airfoil of an adjacent vane 900₂.

For connecting together the vanes, a connection by brazing and/or co-densification may then be achieved between the inner surface of the flowpath delimiting inner platform portion 942 of a first vane 900₁ and the base portion 945 of hooks of an adjacent second vane 900₂, as well as between the outer surface of the flowpath delimiting outer platform portion 962 of the first vane 900₁ and the base portion 765 of hooking legs of the second vane 900₂, as diagrammatically shown by FIG. 28. In addition, upon machining of the unitary vanes, the end edges of the flowpath delimiting inner and outer platform portions of a first vane 900₁ could be machined to substantially adjust to the profile of the adjacent airfoil of an adjacent second vane 900₂.

After a plurality of turbine nozzle segments 990 have been fabricated, they are mounted in a low pressure turbine casing of a turbomachine, to form a turbine nozzle 1300.

FIG. 29 partially shows a multi-stage low pressure turbine of a turbomachine, which turbine comprises a plurality of turbine nozzles 1300 alternating with mobile wheels 1310 in the direction of the gas flowing through the turbine (arrow F), the turbine nozzles being mounted in a turbine casing 1314.

The mobile wheels 1310 carry a plurality of blades 1312.

The turbine nozzle 1300 shown on FIG. 29 is formed of a plurality of adjoining nozzle segments 990 and is mounted in the turbine casing by means of the hooking legs 964, 966 of the vanes 900₂ included in the nozzle segments.

The platform portions. 942, 962 of the inner and outer platforms of the vanes 900₁ delimit the gas flow passage 1315 through the turbine nozzle 1300.

On the inside, a ring 1316 supporting an abradable material 1318 is supported formed by the hooks 944, 946 of the vanes 900₂ included in the nozzle segments. The abradable material 1318 cooperates with wipers carried by a mobile wheel adjacent the turbine nozzle 1300, in a well-known manner.

Other Embodiments

In the second embodiment described above, hooks are formed on the inside of inner platforms in order to carry a ring supporting abradable material. Instead of hooks, overhangs could be formed.

The second embodiment described above relates to CMC vanes and nozzle segments for a low-pressure turbine. The invention is similarly applicable to CMC turbine nozzles for turbine spools other than low-pressure turbines as well as to compressor stators, in particular in compressor stages which in use are exposed to high temperatures.

A multi-stage turbomachine compressor, for example of an aeroengine is partially and very diagrammatically shown by FIG. 30. The compressor, for example a high-pressure compressor, comprises a plurality of stators 1410 alternating with rotating wheels 1430 and mounted in a compressor casing 1440.

Each rotating wheel carries a plurality of blades 1432.

At least one of the compressor stators, e.g. the stator 1410 of FIG. 30 is formed by assembling stator segments 1412 in CMC material. Each stator segment is formed by assembling unitary single-airfoil vanes and comprises an inner platform assembly 1414, an outer platform assembly 1416 and airfoils 1418 extending between the inner and outer platform assemblies and formed integrally therewith. The platform assemblies 1414 and 1416 comprise portions forming gas flow passage inner and outer wall portions 1414*a* and 1416*a* which delimit the passage 1445 for the air flow through the compressor at the level of the compressor stator 1410.

On the inside, each platform assembly 1414 includes hooks 1415*a*, 1415*b*, whereas, on the outside, each platform assembly 1416 includes hooking legs 1417*a*, 1417*b*.

The stator segments are supported in the compressor casing 1440 by means of the hooking legs 1417*a*, 1417*b* whereas the hooks 1415*a*, 1415*b* support a metallic ring 1450 carrying abradable material 1451. The abradable material 1451 cooperate with wipers carried by a mobile wheel adjacent the compressor stator in a well-known manner.

The single-airfoil vanes constituting each stator segment are made and assembled together as described above for unitary vanes forming turbine nozzle segments.

Here above, the fabrication of a compressor stator in a CMC material has been envisaged. When the temperatures to which the compressor stator is exposed in use are lower, in particular in the upstream stages of a compressor, an organic matrix composite (OMC) material may be used, made with fibers for instance of carbon or glass and with a polymer matrix.

A segment of OMC material compressor stator is obtained by assembling single-airfoil vanes.

After weaving an assembly of fiber strips, cutting out of individual blanks and shaping by means of a shaping tooling, as in steps 1201, 1206 and 1207 of the method of FIG. 26, each vane preform obtained is impregnated by a resin by injection or infusion while being kept in the shaping tooling. The resin is cured by heat treatment to obtain a partially densified consolidated vane preform. After machining, a plurality of consolidated vane preforms are assembled together and maintained in a tooling. The assembled consolidated preforms are co-densified, the co-densification being achieved by performing at least one cycle of resin impregnation and curing. A final machining may be performed. The resin used for consolidation and co-densification is a resin precursor of a polymer matrix such as an epoxide, bismaleimide (BMI) or polyimide resin, for example.

The invention claimed is:

1. A method for fabricating a turbomachine set of blades made of composite material including a fiber reinforcement densified by a matrix, the method including:
    fabrication by three-dimensional weaving of a first one-piece fiber blank,
    shaping of the first fiber blank to obtain a first one-piece fiber blade preform having:
        a first portion constituting a preform of an airfoil and a blade root,
        a second portion constituting a preform of a blade inner platform, said blade preform then lacking a blade anti-tilting wall preform, or constituting of a blade and
        a third portion constituting a preform of a blade outer platform spoiler plate, said blade preform then lacking a blade outer platform wiper plate preform, and
    fabrication by three-dimensional weaving of a second one-piece fiber blank,
    shaping of the second fiber blank to obtain a second one-piece fiber blade preform having:
        a first portion constituting a preform of an airfoil and a blade root,
        a second portion constituting a preform of a blade anti-tilting wall, said blade preform then lacking a blade inner platform preform, and
        a third portion constituting a preform of a blade outer platform wiper plate, said blade preform then lacking a blade outer platform spoiler plate preform, and
    densification of the first and second preforms by a matrix to obtain first and second blades made of composite material having a fiber reinforcement consisting of the preform and densified by the matrix, said first blade constituting a single part with a blade inner platform and blade outer platform spoilers, and a second blade constituting a single part with a blade anti-tilting wall and blade outer platform wipers, or
    fabrication by three-dimensional weaving of a first one-piece fiber blank,
    shaping of the first fiber blank to obtain a first one-piece fiber blade preform having:
        a first portion constituting a preform of an airfoil and a blade root,
        a second portion constituting a blade anti-tilting wall preform, said blade preform then lacking blade inner platform preform, and
        a third portion constituting a preform of a blade outer platform spoiler plate, said blade preform then lacking a blade outer platform wiper plate preform, and
    fabrication by three-dimensional weaving of a second one-piece fiber blank,
    shaping of the second fiber blank to obtain a second one-piece fiber blade preform having:
        a first portion constituting a preform of an airfoil and a blade root,
        a second portion constituting a preform of a blade inner platform preform, said blade preform then lacking a blade anti-tilting wall, and
        a third portion constituting a preform of a blade outer platform wiper plate, said blade preform then lacking a blade outer platform spoiler plate preform, and
    densification of the first and second preforms by a matrix to obtain first and second blades made of composite material having a fiber reinforcement consisting of the preform and densified by the matrix, said first blade constituting a single part with a blade anti-tilting wall and blade outer platform spoilers, and said second blade constituting a single part with a blade inner platform and blade outer platform wipers.

2. A method according to claim 1, wherein, in the longitudinal direction of the fiber blank corresponding to the longitudinal direction of the blade to be fabricated, the fiber blank includes a first set of several layers of yarns which are interlinked to constitute a first portion of the blank corresponding to the airfoil and the blade root preform, and a second set of several layers of yarns which are interlinked at least locally to constitute a second portion of the blank corresponding to an inner platform or blade anti-tilting wall preform and a third portion of the blank corresponding to a spoiler or blade root wiper plate preform,
    the yarns of the first set of yarn layers being not linked to the yarns of the second set of yarn layers, and
    the first set of yarn layers has yarns of the second set of yarn layers passing through it at the second and at the third portion of the blank.

3. A method according to claim 2, wherein the fiber blank is woven with a second continuous set of yarn layers and the shaping of the fiber blank includes the elimination by cutting out of portions of the second set of yarn layers outside of the second portion of the fiber blank and of the third portion of the fiber blank.

4. A method according to claim 2, wherein, at the location or at least at one of the locations where the first set of yarn layers has yarns of the second set of yarn layers passing through it, the intersection between a yarn layer of the first set and a yarn layer of the second set follows a line that is not orthogonal to the longitudinal direction of the fiber blank.

5. A method according to claim 1, wherein, in the first portion of the fiber blank and in a direction corresponding to that extending along the profile of an airfoil of variable thickness in the blade to be fabricated, the number of yarn layers in the first set of yarn layers is constant.

6. A method according to claim 5, wherein the yarns of the first set of yarn layers are of variable weight.

7. A method according to claim 5, wherein the count of the yarns of the first set of yarn layers is variable.

8. A method according to claim 1, wherein a strip including a succession of fiber blanks is fabricated by three-dimensional weaving.

9. A method according to claim 1, wherein the blanks are woven with their longitudinal direction corresponding to that of the blades to be fabricated extending in the weft direction.

10. A method according to claim 1, wherein the blanks are woven with their longitudinal direction corresponding to that of the blades to be fabricated extending in the warp direction.

11. A set of first and second turbomachine blades made of composite material including a fiber reinforcement obtained by three-dimensional weaving and densified by a matrix,
    the first blade including:
        a first portion constituting an airfoil and a blade root,
        a second portion constituting a blade inner platform, said blade then lacking a blade anti-tilting wall, and
        a third portion constituting a blade outer platform spoiler plate, said blade then lacking a blade outer platform wiper plate, and
    the second blade including:
        a first portion constituting an airfoil and a blade root,
        a second portion constituting a blade anti-tilting wall, said blade then lacking a blade inner platform, and
        a third portion constituting a blade outer platform wiper plate,
    the blade then lacking a blade outer platform spoiler plate, or
    the first blade including:
        a first portion constituting an airfoil and a blade root
        a second portion constituting a blade anti-tilting wall preform, said blade preform then lacking blade inner platform preform, and
        a third portion constituting a preform of a blade outer platform spoiler plate, said blade preform then lacking a blade outer platform wiper plate preform, and
    the second blade including:
        a first portion constituting a preform of an airfoil and a blade root,
        a second portion constituting a preform of a blade inner platform preform, said blade preform then lacking a blade anti-tilting wall, and
        a third portion constituting a preform of a blade outer platform wiper plate, said blade preform then lacking a blade outer platform spoiler plate preform.

12. A turbomachine disk having a plurality of sets of blades according to claim 11.

13. A turbomachine equipped with a plurality of sets of blade according to claim 11.

14. A method for making at least a segment of a turbomachine wheel, the method comprising assembling together a plurality of first blades or vanes and a plurality of second blades or vanes in alternation with the first blades or vanes, the first and second blades or vanes being made of composite material including a fiber reinforcement made by three-dimensional weaving and densified by a matrix,
    each of the first blades or vanes comprising a first portion forming at least an airfoil and formed integrally with:
        a second portion selected from a flowpath delimiting inner platform portion and an inner portion of an inner platform, and
        a third portion selected from a flowpath delimiting outer platform portion and an outer portion of an outer platform,
    each of the second blades or vanes comprising a first portion forming at least an airfoil and formed integrally with:
        a second portion selected from a flowpath delimiting inner platform portion and an inner portion of an inner platform, the second portion of a second blade or vane being different from the second portion of a first blade or vane, and
        a third portion selected from a flowpath delimiting outer platform portion and an outer portion of an outer platform, the third portion of a second blade or vane being different from the third portion of a first blade or vane.

15. A method according to claim 14, wherein the making of each blade or vane comprises:
    the fabrication by three-dimensional weaving of a one-piece fiber blank,
    the shaping of the fiber blank to obtain a one-piece fiber blade or vane preform having:
        a first portion constituting a preform of the first blade or vane portion,
        a second portion constituting a preform of the second blade or vane portion, and
        a third portion constituting a preform of the third blade or vane portion, and
    the densification of the preform by a matrix to obtain a blade or vane made of composite material having a fiber reinforcement consisting of the preform and densified by the matrix, and incorporating in a single part said first, second and third blade or vane portions.

16. A method according to claim 15, wherein, in the longitudinal direction of the fiber blank corresponding to the longitudinal direction of the blade or vane to be fabricated, the fiber blank includes a first set of several layers of yarns which are linked together at least partially to constitute a first portion of the blank corresponding to the first preform portion, and a second set of several layers of yarns which are linked together at least locally to constitute a second and a third portion of the blank corresponding to the second and the third preform portion,
    the yarns of the first set of yarn layers being not linked to the yarns of the second set of yarn layers, and
    the first set of yarn layers has yarns of the second set of yarn layers passing through it at the second and at the third portion of the blank.

17. A method according to claim 14 for making a turbomachine rotating wheel by assembling first and second blades together with a rotor disk, wherein the first portion of each first and second blade forms an airfoil and a blade root, and the blade roots are inserted into recesses provided at the periphery of the rotor disk,
    the second portion of a first or second blade being selected from a flowpath delimiting inner platform portion and an inner anti-tilting wall of an inner platform, and
    the third portion of a first or second blade being selected from a flowpath delimiting outer platform portion and an outer wiper plate of an outer platform.

18. A method for fabricating a turbomachine turbine nozzle segment or compressor stator segment out of a composite material, the method comprising:
assembling and connecting together a plurality of first vanes and a plurality of second vanes in alternation with the first vanes, the first and second vanes being made of composite material including a fiber reinforcement made by three-dimensional weaving and densified by a matrix, wherein:
each of the first vanes comprises a first portion forming an airfoil and formed integrally with a second portion forming an inner platform and with a third portion forming a flowpath delimiting outer platform portion;
each of the second vanes comprises a first portion forming an airfoil and formed integrally with a second portion forming an inner platform and with a third portion forming an outer platform portion constituting hooking legs;
the third portion of the first vanes lacking an outer platform portion constituting hooking legs and the third portion of the second vanes lacking a flowpath delimiting outer platform portion;
the making of each vane comprises: making a one-piece fiber blank by three-dimensional weaving, shaping of the fiber blank to obtain a one-piece vane preform having a first preform portion forming a preform for the first vane portion and a second preform portion forming a preform for the second and third vane portion, and densifying the preform with a matrix to obtain a composite material vane having fiber reinforcement constituted by the preform and densified by the matrix;
the vanes are connected together by a process including a step selected from a brazing step and a step of connection by co-densification by a matrix of a plurality of vanes assembled together at an intermediary stage of densification; and
the making of each vane comprises a step of partial densification of the vane preform by a matrix and a subsequent machining step, and the connection of a plurality of vanes together comprises assembling machined vanes together and co-densification by a matrix of the assembled machined vanes.

19. A method according to claim 18 for fabricating a turbine nozzle segment or compressor stator segment out of a ceramic matrix composite material, wherein the assembling of the machined vanes together comprises a pre-ceramic bonding step.

20. A method according to claim 18 for fabricating a turbine nozzle segment or compressor stator segment out of a ceramic matrix composite material, wherein the making of each vane comprises a first and a second step of densification by a ceramic matrix separated by a machining step, and the connection of a plurality of vanes together comprises a step of brazing together vanes assembled together after the second densification step.

21. A method according to claim 18, wherein, in the longitudinal direction of the fiber blank that corresponds to the longitudinal direction of a vane that is to be made, the fiber blank comprises a first set of a plurality of layers of yarns that are linked together at least partially together to form a first portion of the blank that corresponds to the first portion of the preform, and a second set of a plurality of layers of yarns that are linked together at least locally to form a second portion of the blank that corresponds to the second portion of the preform and to form a third portion of the blank that corresponds to the third portion of the preform,
the yarns of the first set of layers of yarns being not linked to the yarns of the second set of layers of yarns, and yarns of the second set of layers of yarns crossing through the first set of layers of yarns at first and second crossing locations corresponding to the locations of the second and third portions of the blank, respectively.

22. A method for fabricating a turbomachine turbine nozzle segment or compressor stator segment out of a composite material, the method comprising assembling and connecting together a plurality of first vanes and a plurality of second vanes in alternation with the first vanes, the first and second vanes being made of composite material including a fiber reinforcement made by three-dimensional weaving and densified by a matrix, wherein:
each of the first vanes comprises a first portion forming an airfoil and formed integrally with a second portion forming a flowpath delimiting inner platform portion and with a third portion forming an outer platform;
each of the second vanes comprises a first portion forming an airfoil and formed integrally with a second portion forming an inner platform portion constituting hooks or overhangs and with a third portion forming an outer platform;
the second portion of the first vanes lacking an inner platform portion constituting hooks or overhangs and the second portion of the second vanes lacking a flowpath delimiting inner platform portion;
the making of each vane comprises: making a one-piece fiber blank by three-dimensional weaving, shaping of the fiber blank to obtain a one-piece vane preform having a first preform portion forming a preform for the first vane portion and a second preform portion forming a preform for the second and third vane portion, and densifying the preform with a matrix to obtain a composite material vane having fiber reinforcement constituted by the preform and densified by the matrix; and
the vanes are connected together by a process including a step selected from a brazing step and a step of connection by co-densification by a matrix of a plurality of vanes assembled together at an intermediary stage of densification.

23. A method according to claim 22, wherein the making of each vane comprises a step of partial densification of the vane preform by a matrix and a subsequent machining step, and the connection of a plurality of vanes together comprises assembling machined vanes together and co-densification by a matrix of the assembled machined vanes.

24. A method according to claim 23 for fabricating a turbine nozzle segment or compressor stator segment out of a ceramic matrix composite material, wherein the assembling of the machined vanes together comprises a pre-ceramic bonding step.

25. A method according to claim 22 for fabricating a turbine nozzle segment or compressor stator segment out of a ceramic matrix composite material, wherein the making of each vane comprises a first and a second step of densification by a ceramic matrix separated by a machining step, and the connection of a plurality of vanes together comprises a step of brazing together vanes assembled together after the second densification step.

26. A method according to claim 22, wherein, in the longitudinal direction of the fiber blank that corresponds to the longitudinal direction of a vane that is to be made, the fiber blank comprises a first set of a plurality of layers of yarns that are linked together at least partially together to form a first portion of the blank that corresponds to the first portion of the preform, and a second set of a plurality of layers of yarns that are linked together at least locally to form a second portion of the blank that corresponds to the second portion of the preform and to form a third portion of the blank that corresponds to the third portion of the preform, the yarns of the first set of layers of yarns being not linked to the yarns of the second set of layers of yarns, and yarns of the second set of layers of yarns crossing through the first set of layers of yarns at first and second crossing locations corresponding to the locations of the second and third portions of the blank, respectively.

27. A turbomachine turbine nozzle segment or compressor stator segment comprising a plurality of first and second vanes which are connected together with the first vanes alternating with the second vanes, the first and second vanes being made of composite material including a fiber reinforcement made by three-dimensional weaving and densified by a matrix, each of the first vanes comprising a first portion forming an airfoil and formed integrally with a second portion forming an inner platform and with a third portion forming a flowpath delimiting outer platform portion;

each of the second vanes comprising a first portion forming an airfoil and formed integrally with a second portion forming an inner platform and with a third portion forming an outer platform portion constituting hooking legs; and the third portion of the first vanes lacking an outer platform portion constituting hooking legs and the third portion of the second vanes lacking a flowpath delimiting outer platform portion.

28. A turbomachine turbine nozzle segment or compressor stator segment comprising a plurality of first and second vanes which are connected together with the first vanes alternating with the second vanes, the first and second vanes being made of composite material including a fiber reinforcement made by three-dimensional weaving and densified by a matrix, each of the first vanes comprising a first portion forming an airfoil and formed integrally with a second portion forming a flowpath delimiting inner platform portion and with a third portion forming an outer platform;

each of the second vanes comprises a first portion forming an airfoil and formed integrally with a second portion forming an inner platform portion constituting hooks or overhangs and with a third portion forming an outer platform; and the second portion of the first vanes lacking an inner platform portion constituting hooks or overhangs and the second portion of the second vanes lacking a flowpath delimiting inner platform portion.

29. A turbine nozzle or compressor stator comprising a casing and a plurality of segments according to claim 27 mounted in the casing by means of said hooking legs.

30. A turbine nozzle or compressor stator comprising a plurality of segments according to claim 28 supporting an abradable material carrying ring by means of said hooks.

* * * * *